(12) United States Patent
Williams et al.

(10) Patent No.: US 12,358,215 B2
(45) Date of Patent: Jul. 15, 2025

(54) BINDERS AND METHODS OF BINDER JETTING INCLUDING BRANCHED POLYMER BINDERS AND ARTICLES MADE THEREFROM

(71) Applicant: VIRGINIA TECH INTELLECTUAL PROPERTIES, INC., Blacksburg, VA (US)

(72) Inventors: Christopher B. Williams, Blacksburg, VA (US); Emily M. Wilts, Blacksburg, VA (US); Timothy E. Long, Blacksburg, VA (US); Da Ma, Blacksburg, VA (US)

(73) Assignee: VIRGINIA TECH INTELLECTUAL PROPERTIES, INC., Blacksburg, VA (US)

( * ) Notice: Subject to any disclaimer, the term of this patent is extended or adjusted under 35 U.S.C. 154(b) by 90 days.

(21) Appl. No.: 17/442,811

(22) PCT Filed: Mar. 25, 2020

(86) PCT No.: PCT/US2020/024786
§ 371 (c)(1),
(2) Date: Sep. 24, 2021

(87) PCT Pub. No.: WO2020/198400
PCT Pub. Date: Oct. 1, 2020

(65) Prior Publication Data
US 2022/0088855 A1    Mar. 24, 2022

Related U.S. Application Data

(60) Provisional application No. 62/823,486, filed on Mar. 25, 2019.

(51) Int. Cl.
B29C 64/153 (2017.01)
B22F 1/052 (2022.01)
(Continued)

(52) U.S. Cl.
CPC ............ B29C 64/165 (2017.08); B22F 1/052 (2022.01); B22F 10/14 (2021.01); B29C 64/153 (2017.08);
(Continued)

(58) Field of Classification Search
CPC .................................................. B29C 64/153
See application file for complete search history.

(56) References Cited

U.S. PATENT DOCUMENTS

| | | |
|---|---|---|
| 2018/0134911 A1 | 5/2018 | Neuman |
| 2018/0304361 A1 | 10/2018 | Gibson et al. |
| 2019/0054527 A1* | 2/2019 | Natarajan ................ C08K 3/08 |

* cited by examiner

Primary Examiner — Anthony M Liang
(74) Attorney, Agent, or Firm — THOMAS | HORSTEMEYER, LLP

(57) ABSTRACT

Binders and methods of binder jetting are provided based on the use of branched polymer binders. The applicants have found that, even more so than the molecular weight, the ability to achieve higher maximum printable concentrations leads to higher densities and improved structural properties of the manufactured articles. The methods can be used for a variety of articles from metal parts to structural ceramics, to tablets and other oral dosage forms. The branched chain polymers can include a short-chain branched polymer; a long-chained branched polymer; a hyper-branched polymer, a cyclic polymer; a comb-type polymer; a 3-arm star type polymer, a 4-arm star type polymer, a dendritic polymer, and a combination thereof. The branched-chain polymer can include various polymers such as polyvinylpyrrolidone, poly(vinyl alcohol), or poly(acrylic acid).

10 Claims, 9 Drawing Sheets

(51) Int. Cl.
  *B22F 10/14* (2021.01)
  *B29C 64/165* (2017.01)
  *B29C 64/209* (2017.01)
  *B33Y 10/00* (2015.01)
  *B33Y 30/00* (2015.01)
  *B33Y 70/00* (2020.01)
(52) U.S. Cl.
  CPC ............ *B29C 64/209* (2017.08); *B33Y 10/00* (2014.12); *B33Y 30/00* (2014.12); *B33Y 70/00* (2014.12)

BINDERS AND METHODS OF BINDER JETTING INCLUDING BRANCHED POLYMER BINDERS AND ARTICLES MADE THEREFROM

This application is the 35 U.S.C. § 371 national stage application of PCT Application No. PCT/US2020/024786, filed Mar. 25, 2020, where the PCT claims priority to, and the benefit of, U.S. provisional application entitled "STAR, BRANCHED, AND GRAFT POLYMERS IN BINDERS FOR INKJET ADDITIVE MANUFACTURING OF PERSONALIZED TABLETS" having Ser. No. 62/823,486, filed Mar. 25, 2019, both of which are herein incorporated by reference in their entireties.

TECHNICAL FIELD

The present disclosure generally relates to additive manufacturing methods and compositions.

BACKGROUND

Binder Jetting is an additive manufacturing process in which a liquid binding agent is selectively deposited to join powder particles. Layers of material are then bonded to form an object. The printhead drops binder into the powder selectively to form the objects layer-by-layer. The job box lowers and another layer of powder is then spread and binder is added. Over time, the part develops through the layering of powder and binder.

Binder Jetting is capable of printing a variety of materials including metals, sands, ceramics, inorganic particles, carbon materials, organic materials, pharmaceuticals, and the like. Some materials, like sand, require no additional processing. Other materials are typically cured and sintered and sometimes infiltrated with another material, depending on the application.

Binder Jetting offers several advantages. Due to its ability to produce solid layers, Binder Jetting is often considered the best option for 3D printing. Binder Jetting also has the ability to print very large objects. Room sized architectural structures have been printed with Binder Jetting. Binder Jetting is also unique in that it does not require that one employ heat during the build process. Further, because the printed object is supported by the powder bed, there is no need for a build plate to be added to the printed components for stability during the build process.

Despite the benefits and ease, the binder jetting process may still produce parts not suitable for structural applications due to the insufficient consolidation of the powder in the finished part, leading to decreased density and decreased structural integrity of the printed part. Many solutions have been examined to produce binder jetted parts with improved mechanical properties. These have focused on, for example, selection of feedstock, printing parameters, intering temperature, time, atmosphere, and heating rate of binder jet manufactured parts (Mirzababaei, S. and Pasebani, S., *J. Manuf. Mater. Process.* 2019, 3, 82).

There remains a need for improved binder jetting methods, compositions, and objects made therefrom that overcome the aforementioned deficiencies.

SUMMARY

Methods of binder jetting of a 3D-printed article are provided as well as binders for binder jetting that overcome one or more of the aforementioned deficiencies. Applicants have found that, by using a binder based on branched-chain polymers higher binder density can be achieved while maintaining the ability of the binder to be jetted and leading to improved mechanical properties of the 3D-printed articles. In some aspects, the concentration of the branched-chain polymer in the binder is above a maximum printable concentration of the otherwise same binder and under the otherwise same conditions except replacing the branched-chain polymer with a linear-chain polymer of the same repeat units and having the same $M_n$.

In some aspects, a method is provided for binder jetting of a 3D-printed article in a layer-by-layer fashion, the method including providing a first layer of powder; ink-jet depositing a binder onto the first layer of the powder in a pattern that corresponds to a first layer of the article; providing a subsequent layer of powder onto either the first layer of powder or a previous layer of powder; ink-jet depositing the binder onto the subsequent layer of powder in a pattern that corresponds to a subsequent layer of the article; repeating these steps to form the article layer-by-layer by forming each subsequent layer of the article on a previous layer of the article.

Suitable polymers can include short-chain branched polymer; a long-chained branched polymer; a hyper-branched polymer, a cyclic polymer; a comb-type polymer; a 3-arm star type polymer, a 4-arm star type polymer, a dendritic polymer, and a combination thereof. Suitable polymer chemistries can include just about any chemistry, especially those capable of RAFT polymerization. Examples include of polycarbonates, polyolefins, polymethacrylates, polystyrenes, polyamides, polyurethanes, poly(ethylene terephthalate), poly(lactic acid), poly(glycolic acid), polyhydroxybutyrate, polydioxanones (e.g., 1,4-dioxanone), δ-valerolactone, 1-dioxepanones (e.g., 1,4-dioxepan-2-one and 1,5-dioxepan-2-one), polyesters, poly(ethylene glycol), poly(ethylene oxides), polyacrylamides, cellulose esters, fluoropolymers, vinyl polymers, silk, collagen, alginate, chitin, chitosan, hyaluronic acid, chondroitin sulfate, glycosaminoglycans, poly(hydroxyethyl methacrylate), polyvinylpyrrolidone, poly(vinyl alcohol), poly(acrylic acid), polyacetate, polycaprolactone, poly(propylene, glycol)s, poly(amino acids), copoly (ether-esters), poly(alkylene oxalates), polyamides, poly(iminocarbonates), polyoxaesters, polyorthoesters, polyphosphazenes, polypeptides and copolymers, block copolymers, homopolymers, blends and combinations thereof.

Binders and articles prepared from the binders and methods are also provided. Other systems, methods, features, and advantages of binder jetting methods and binders will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Further aspects of the present disclosure will be readily appreciated upon review of the detailed description of its various embodiments, described below, when taken in conjunction with the accompanying drawings.

DETAILED DESCRIPTION

Figure 1:
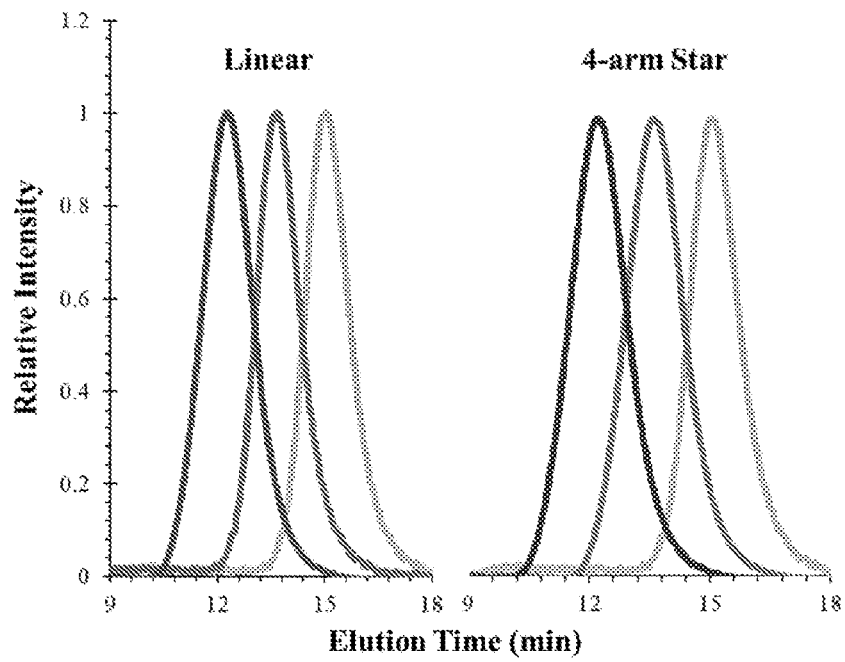
FIG. 1 as a plot of the aqueous size exclusion chromatography (SEC) light scattering traces of linear and 4-arm star poly(vinyl pyrrolidone) (PVP) depicting signal intensity as a function of elution time in minutes.

In various aspects, binder compositions and methods of binder jetting are provided based on the use of various branched polymer structures. Additionally, printed objects are provided made from the binders and methods. The binders and methods can overcome one or more of the aforementioned deficiencies in conventional methods, e.g. by providing improved densities and structural integrity of the printed objects. In one particular aspect, printed tablets are provided made using a 4-arm star-shaped poly(vinyl pyrrolidone) (PVP). The printed tablets demonstrate improved mechanical properties such as an improved crush strength compared to those prepared with linear PVP.

Before the present disclosure is described in greater detail, it is to be understood that this disclosure is not limited to particular embodiments described, and as such may, of course, vary. It is also to be understood that the terminology used herein is for the purpose of describing particular embodiments only, and is not intended to be limiting. The skilled artisan will recognize many variants and adaptations of the embodiments described herein. These variants and adaptations are intended to be included in the teachings of this disclosure.

All publications and patents cited in this specification are cited to disclose and describe the methods and/or materials in connection with which the publications are cited. All such publications and patents are herein incorporated by references as if each individual publication or patent were specifically and individually indicated to be incorporated by reference. Such incorporation by reference is expressly limited to the methods and/or materials described in the cited publications and patents and does not extend to any lexicographical definitions from the cited publications and patents. Any lexicographical definition in the publications and patents cited that is not also expressly repeated in the instant specification should not be treated as such and should not be read as defining any terms appearing in the accompanying claims. The citation of any publication is for its disclosure prior to the filing date and should not be construed as an admission that the present disclosure is not entitled to antedate such publication by virtue of prior disclosure. Further, the dates of publication provided could be different from the actual publication dates that may need to be independently confirmed.

Although any methods and materials similar or equivalent to those described herein can also be used in the practice or testing of the present disclosure, the preferred methods and materials are now described. Functions or constructions well-known in the art may not be described in detail for brevity and/or clarity. Embodiments of the present disclosure will employ, unless otherwise indicated, techniques of additive manufacturing, nanotechnology, organic chemistry, material science and engineering and the like, which are within the skill of the art. Such techniques are explained fully in the literature.

It should be noted that ratios, concentrations, amounts, and other numerical data can be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a numerical range of "about 0.1% to about 5%" should be interpreted to include not only the explicitly recited values of about 0.1% to about 5%, but also include individual values (e.g., 1%, 2%, 3%, and 4%) and the sub-ranges (e.g., 0.5%, 1.1%, 2.2%, 3.3%, and 4.4%) within the indicated range. Where the stated range includes one or both of the limits, ranges excluding either or both of those included limits are also included in the disclosure, e.g. the phrase "x to y" includes the range from 'x' to 'y' as well as the range greater than 'x' and less than 'y'. The range can also be expressed as an upper limit, e.g. 'about x, y, z, or less' and should be interpreted to include the specific ranges of 'about x', 'about y', and 'about z' as well as the ranges of 'less than x', less than y', and 'less than z'. Likewise, the phrase 'about x, y, z, or greater' should be interpreted to include the specific ranges of 'about x', 'about y', and 'about z' as well as the ranges of 'greater than x', greater than y', and 'greater than z'. In some embodiments, the term "about" can include traditional rounding according to significant figures of the numerical value. In addition, the phrase "about 'x' to 'y'", where 'x' and 'y' are numerical values, includes "about 'x' to about 'y'".

In some instances, units may be used herein that are non-metric or non-SI units. Such units may be, for instance, in U.S. Customary Measures, e.g., as set forth by the National Institute of Standards and Technology, Department of Commerce, United States of America in publications such as NIST HB 44, NIST HB 133, NIST SP 811, NIST SP 1038, NBS Miscellaneous Publication 214, and the like. The units in U.S. Customary Measures are understood to include equivalent dimensions in metric and other units (e.g., a dimension disclosed as "1 inch" is intended to mean an equivalent dimension of "2.5 cm"; a unit disclosed as "1 pcf" is intended to mean an equivalent dimension of 0.157 kN/m³; or a unit disclosed 100° F. is intended to mean an equivalent dimension of 37.8° C.; and the like) as understood by a person of ordinary skill in the art. Conversions between units are readily known to those skilled in the art, for example a temperature in ° F. may be converted to an approximate temperature in ° C. using the well-known formula $T_{(°C.)}=T_{(°F.)}-32)\times 5/9$. Unless otherwise specified, values and measurements referred to herein are based on atmospheric pressure (i.e. one atmosphere) and room temperature.

The use of "for example" or "such as" to list illustrative examples should not be construed to limit the disclosure or the claims to only the listed examples. Thus, "for example" or "such as" can mean "for example, but not limited to" or "such as, but not limited to" and encompasses other similar or equivalent examples. This is not to mean that, in some aspects, such illustrative examples may not be preferred aspects under the circumstances.

Definitions

Unless defined otherwise, all technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the specification and relevant art and should not be interpreted in an idealized or overly formal sense unless expressly defined herein.

The articles "a" and "an," as used herein, mean one or more when applied to any feature in embodiments of the present invention described in the specification and claims. The use of "a" and "an" does not limit the meaning to a single feature unless such a limit is specifically stated. The article "the" preceding singular or plural nouns or noun phrases denotes a particular specified feature or particular specified features and may have a singular or plural connotation depending upon the context in which it is used.

The terms "ambient temperature" and "room temperature," as interchangeably used herein, refer to a temperature between about 18° C. and about 30° C. Usually, room temperature ranges from about 20° C. to about 25° C.

The term "substituted" as used herein, refers to the substitution of one functional group for another functional group, e.g. substituting a hydrocarbon group with another group. Groups can include hydrocarbons, hydrogen atoms, halogen atoms such as chlorine, fluorine, bromine, and iodine; halogen atom containing groups such as chloromethyl, perfluorobutyl, trifluoroethyl, and nonafluorohexyl; oxygen atoms; oxygen atom containing groups such as (meth)acrylic and carboxyl; nitrogen atoms; nitrogen atom containing groups such as amines, amino-functional groups, amido-functional groups, and cyano-functional groups; sulphur atoms; and sulphur atom containing groups such as mercapto groups.

The term "polymer," as used herein, is given its ordinary meaning as used in the art, i.e., a molecular structure comprising one or more repeat units (monomers), connected by covalent bonds. The repeat units may all be identical, or in some cases, there may be more than one type of repeat unit present within the polymer. If more than one type of repeat unit is present within the polymer, then the polymer is said to be a "copolymer." It is to be understood that in any embodiment employing a polymer, the polymer being employed may be a copolymer in some cases. The repeat units forming the copolymer may be arranged in any fashion. For example, the repeat units may be arranged in a random order, in an alternating order, or as a block copolymer, i.e., comprising one or more regions each comprising a first repeat unit (e.g., a first block), and one or more regions each comprising a second repeat unit (e.g., a second block), etc. Block copolymers may have two (a diblock copolymer), three (a triblock copolymer), or more numbers of distinct blocks.

The term "polymer backbone" refers to the main chain of the polymer and has one or more types of repeating subunits. One or more side chains can be attached to the polymer backbone and can have a multitude of structures.

The term "branch-chained polymer," as used herein, indicates a polymer which is not linear, that is, one in which the polymer molecule is not composed primarily of a single linear chain of monomers linked end to end. Examples of branched-chain polymers include short-chain branched polymer; a long-chained branched polymer; a hyper-branched polymer, a cyclic polymer; a comb-type polymer; a 3-arm star type polymer, a 4-arm star type polymer, a dendritic polymer, and a combination thereof. Branched-chain polymers differ from cross-linked polymer networks which tend towards an infinite size having interconnected molecules and which are generally not soluble. In some instances, branched polymers have advantageous properties when compared to analogous linear polymers. For example, higher molecular weights of branched-chain polymers can be solubilized more easily than those of corresponding linear polymers. Highly branched polymers include, for example, dendrimers and hyperbranched polymers.

The term "short-chain branched polymer" refers to branched-chain polymers where the individual polymer chains have about 10 to about 500 repeat units. The term "long-chained branched polymer" refers to branched-chain polymers where the individual polymer chains have more than about 500 repeat units.

The term "hyper-branched polymer," refers to polymers or oligomers that have highly branched, three-dimensional, tree-like structures with a plurality of branching points. Hyper-branched polymers can be distinguished from star-type polymers which consist of multiple polymer or oligomer chains (three or more chains) extending from a central core. Some hyperbranched polymers, on the other hand, can be characterized by having a "nucleus" and multiple generations of branches, e.g. one or more generations of branches and an outermost generation of branches that terminate with end group functionalities. As used herein, "nucleus" refers to a central monomer from which branches extend. In some aspects, a hyper-branched polymers can be monodisperse, having a regular and highly symmetric branching structure. Such monodispersed hyper-branched polymers can be referred to in the art as "dendrimers" or "dendritic" polymers.

The term "cyclic polymer," as used herein, refers to a polymer where ends of the polymer backbone are covalently joined to form a large cyclic structure.

The term "comb-type polymer," as used herein, refers to a polymer having two, three, four, or more polymer chains extending from a backbone of a shorter polymer or oligomer.

The term "star type polymer," as used herein, refers to a polymer having three or more polymer or oligomer chains extending from a central core molecule. Star-type polymers can be characterized by the number of "arms" extending from the central core structure. For example. a "3-arm star type polymer" has three polymer chains extending from the central core where a "4-arm star type polymer" has four polymer chains extending from the central core.

As used herein, the term "number average molecular weight" or "$M_n$" refers to the common mean or average of the molecular weights of the individual polymers. The number average molecular weight of a polymer can be determined by gel permeation chromatography, viscometry (Mark-Houwink equation), light scattering, analytical ultracentrifugation, vapor pressure osmometry, end-group titration, and colligative properties.

As used herein, the term "weight average molecular weight" or "$M_w$" is an alternative measure of the molecular weight computed by the formula $$M_w = \frac{\sum_i N_i M_i^2}{\sum_i N_i M_i}$$

where $N_i$ is the number of molecules having molecular weight $M_i$.

As used herein, the terms "polydispersity" and "polydispersity index" (PDI) refer to the ratio of the weight average to the number average ($M_w/M_n$).

Binder Jetting

The basic three-dimensional printing process was developed in the 1990's at the Massachusetts Institute of Technology and is described in several United States patents, including the following U.S. Pat. No. 5,490,882 to Sachs et al., U.S. Pat. No. 5,490,962 to Cima et al., U.S. Pat. No. 5,518,680 to Cima et al., U.S. Pat. No. 5,660,621 to Bredt et al., U.S. Pat. No. 5,775,402 to Sachs et al., U.S. Pat. No. 5,807,437 to Sachs et al., U.S. Pat. No. 5,814,161 to Sachs et al., U.S. Pat. No. 5,851,465 to Bredt, U.S. Pat. No. 5,869,170 to Cima et al., U.S. Pat. No. 5,940,674 to Sachs et al., U.S. Pat. No. 6,036,777 to Sachs et al., U.S. Pat. No. 6,070,973 to Sachs et al., U.S. Pat. No. 6,109,332 to Sachs et al., U.S. Pat. No. 6,112,804 to Sachs et al., U.S. Pat. No. 6,139,574 to Vacanti et al., U.S. Pat. No. 6,146,567 to Sachs et al., U.S. Pat. No. 6,176,874 to Vacanti et al., U.S. Pat. No. 6,197,575 to Griffith et al., U.S. Pat. No. 6,280,771 to Monkhouse et al., U.S. Pat. No. 6,354,361 to Sachs et al., U.S. Pat. No. 6,397,722 to Sachs et al., U.S. Pat. No. 6,454,811 to Sherwood et al., U.S. Pat. No. 6,471,992 to Yoo et al., U.S. Pat. No. 6,508,980 to Sachs et al., U.S. Pat. No. 6,514,518 to Monkhouse et al., U.S. Pat. No. 6,530,958 to Cima et al., U.S. Pat. No. 6,596,224 to Sachs et al., U.S. Pat. No. 6,629,559 to Sachs et al., U.S. Pat. No. 6,945,638 to Teung et al., U.S. Pat. No. 7,077,334 to Sachs et al., U.S. Pat. No. 7,250,134 to Sachs et al., U.S. Pat. No. 7,276,252 to Payumo et al., U.S. Pat. No. 7,300,668 to Pryce et al., U.S. Pat. No. 7,815,826 to Serdy et al., U.S. Pat. No. 7,820,201 to Pryce et al., U.S. Pat. No. 7,875,290 to Payumo et al., U.S. Pat. No. 7,931,914 to Pryce et al., U.S. Pat. No. 8,088,415 to Wang et al., U.S. Pat. No. 8,211,226 to Bredt et al., and U.S. Pat. No. 8,465,777 to Wang et al., each of which are incorporated by reference.

A typical implementation of the 3D Printing process begins with the definition of a three-dimensional geometry using computer-aided design (CAD) software. This CAD data is then processed with software that slices the model into many thin layers, which are essentially two-dimensional. A physical article is then created by the successive printing of these layers to recreate the desired geometry. An individual layer is printed by first spreading a thin layer of powder and then printing binder to adhere the powder together in selected regions to create the desired layer pattern. The growing part is lowered by a piston and a new layer of powder is spread on top. This process is repeated until all the layers have been printed. The binder joins powder together within a layer and between layers. After printing is complete, the unbound powder is removed, leaving a n article with the desired geometry. In some aspects, the article is a green article that will experience further processing, such as sintering. However, in some circumstances, the article can be a final article.

The printing process involves the spreading of a layer of a powder (typically in a powder bed) and then selectively inkjet-printing a binder fluid onto that layer to cause selected portions of the powder to bind together. This sequence is repeated for additional layers until the desired article has been constructed. The material making up the particulate layer is often referred as the "build material" or the "build material powder" and the jetted fluid is often referred to as a "binder," or in some cases, an "activator." During the process, the portions of the powder layers which are not bonded together with the binder form a bed of supporting powder around the article or articles which are being made, i.e. a "powder bed" or "build bed."

The layers can each be of various dimensions, including thickness and width. Thickness and/or width tolerances of the layers may depend on the 3D printing process used, with certain printing processes having high resolutions and others having low resolutions. Thicknesses of the layers can be uniform or may vary, and average thicknesses of the layers can be the same or different. Average thickness is generally associated with thickness of the layer immediately after printing. In various aspects, the layers independently have an average thickness of from about 1 to about 10,000 µm, about 2 µm to about 1,000 µm, about 5 µm to about 750 µm, about 10 µm to about 500 µm, about 25 µm to about 250 µm, or about 50 µm to 100 µm. Thinner and thicker thicknesses are also contemplated. This disclosure is not limited to any particular dimensions of any of the layers.

In certain aspects, printing of the subsequent layer occurs before the previous layer has reached a fully solidified state, i.e., while the previous layer is an at least partially solidified layer that is still pliable upon the application of force. In certain aspects, depending on a level of solidification of the at least partially solidified layer, there may be at least some intermixing between the at least partially solidified layer and the subsequent layer at the print line. There may be certain advantages in such intermixing. The layers may also be formed around one or more substructures that can provide support or another function of the 3D article.

In some aspects, a method is provided for binder jetting of a 3D-printed article in a layer-by-layer fashion. The method can include providing a first layer of powder, for example by providing a layer of the powder in a powder bed. The methods can include ink-jet depositing a binder onto the first layer of the powder in a pattern that corresponds to a first layer of the article, wherein the binder includes a binder containing a branched-chain polymer as described herein. The methods can include providing a subsequent layer of powder onto either the first layer of powder or a previous layer of powder. For example, this can be accomplished by lowering the powder bed after each layer (a previous layer) and providing a subsequent layer of the powder onto the previous layer. The methods can then include ink-jet depositing the binder onto the subsequent layer of powder in a pattern that corresponds to a subsequent layer of the article. These steps can be repeated to form the article layer-by-layer by forming each subsequent layer of the article on a previous layer of the article.

Post-build processing of the three-dimensionally printed article, i.e., the powder version of the article, may be required in some aspects in order to strengthen and/or densify the part. Often, the first post-processing step will be to heat the powder version of the article while it is still supported by the powder bed to cure the binder, followed by a second step of removing the powder version of the article from the powder bed, and a third step of heat treating the powder version of the article to sinter together the powder particles of the powder version or to affect changes in the binder. In some aspects, the post-processing involves heating the powder version of the article while it is still supported by the powder bed to cure the binder, but without any subsequent sintering step.

Branched-Chain Polymers and Methods of Making

U.S. Pat. No. 9,611,355 describes the use of branched polymers for build powders such as in selective laser sintering. However, branched-chain polymers have not been used in the binder resin for binder jetting applications. Applicants have found that, by using certain branched-chain polymers in the binder they are able to achieve binder jetted articles with improved physical properties, e.g. greater structural integrity and greater packing density than by using the conventional linear chain polymer binders. A variety of branched-chain polymers can be used in various aspects described herein.

The branched-chain polymers can include a short-chain branched polymer; a long-chained branched polymer; a hyper-branched polymer, a cyclic polymer; a comb-type polymer; a 3-arm star type polymer, a 4-arm star type polymer, a dendritic polymer, or a combination thereof. The branched-chain polymer can include a homopolymer, a random or statistical copolymer, a block copolymer, or a combination thereof.

A variety of polymer types are available as branched-chain polymers, either available commercially, or available to be synthesized using the teachings provided herein or using synthetic methods known in the art. In some aspects, the branched-chain polymers include polycarbonates, polyolefins, polymethacrylates, polystyrenes, polyamides, polyurethanes, poly(ethylene terephthalate), poly(lactic acid), poly(glycolic acid), polyhydroxbutyrate, polydioxanones (e.g., 1,4-dioxanone), δ-valerolactone, 1-dioxepanones (e.g., 1,4-dioxepan-2-one and 1,5-dioxepan-2-one), polyesters, poly(ethylene glycol), poly(ethylene oxides), polyacrylamides, cellulose esters, fluoropolymers, vinyl polymers, silk, collagen, alginate, chitin, chitosan, hyaluronic acid, chondroitin sulfate, glycosaminoglycans, poly(hydroxyethyl methacrylate), polyvinylpyrrolidone, poly(vinyl alcohol), poly(acrylic acid), polyacetate, polycaprolactone, poly(propylene, glycol)s, poly(amino acids), copoly (ether-esters), poly(alkylene oxalates), polyamides, poly(iminocarbonates), polyoxaesters, polyorthoesters, polyphosphazenes, polypeptides and copolymers, block copolymers, homopolymers, or blends and combinations thereof.

Those skilled in the art will recognize many branched-chain polymers based on the teaching herein that may be suitable polymers for use in binders described herein. A variety of synthetic methods are also known in the art for producing branched chain polymers. However, in certain aspects, the branched chain polymers herein can be prepared via reversible addition-fragmentation chain-transfer (RAFT) polymerization or another suitable form of controlled free-radical polymerization.

Controlled free-radical polymerization is a form of addition polymerization where the ability of a growing polymer chain to terminate has been removed. The rate of chain initiation is thus much larger than the rate of chain propagation. The result is that the polymer chains grow at a more constant rate than seen in traditional chain polymerization and their lengths remain very similar. The polymerizing step typically occurs in the presence of a free radical initiator, and a catalyst or a chain transfer agent to form the polymer. In RAFT polymerization, the chain is propagated using a chain transfer agent (CTA). Although some details are provided herein for completeness, a comprehensive review of RAFT polymerization is given in C. Barner-Kowollik, Handbook of RAFT Polymerization, Wiley-VCH Verlag GmbH & Co. KGaA, Weinheim, 2008. The Handbook of RAFT Polymerization provides detailed information with respect to inter alia the RAFT polymerization mechanism, process conditions and RAFT agents. The Handbook of RAFT Polymerization is incorporated herein by reference.

The RAFT polymerization reaction starts with initiation. Initiation is accomplished by adding an agent capable of decomposing to form free radicals; the decomposed free radical fragment of the initiator attacks a monomer yielding a propagating radical ($P'_n$), in which additional monomers are added producing a growing polymer chain. In the propagation step, the propagating radical ($P'_n$) adds to a chain transfer agent (CTA), followed by the fragmentation of the intermediate radical forming a dormant polymer chain and a new radical (R). This radical (R') reacts with a new monomer molecule forming a new propagating radical ($P'_m$)— In the chain propagation step, ($P'_n$) and (P'm) reach equilibrium and the dormant polymer chain provides an equal probability to all polymer chains to grow at the same rate, allowing polymers to be synthesized with narrow polydispersity. Termination is limited in RAFT, and, if it occurs, it is negligible. Targeting a specific molecular weight in RAFT can be calculated by multiplying the ratio of monomer consumed to the concentration of CTA used by the molecular weight of the monomer.

In RAFT polymerization, reaction time, temperature, and solvent concentration should be chosen appropriately to ensure the production of non-crosslinked branched-chain polymers. Reaction time relates closely to the temperature the reaction is carried out at: higher temperature requires shorter reaction times and lower temperature requires longer reaction times. Temperatures for the RAFT polymerization can range from room temperature to up to 300° C. The optimal temperature is the minimum at which polymerization can occur over reasonable time scales, e.g., 6-48 hours. Typical reaction temperatures for a RAFT reaction is 250° C. or lower, for instance, from 0 to 250° C., from 50 to 220° C., from 80 to 200° C., from 40 to 100° C., from 50 to 85° C., or from 0 to 50° C. In one embodiment, the polymerizing is carried out at a temperature of 0 to 200° C. The monomer to CTA ratio can vary depending upon the desired molecular weight. In some aspects, RAFT polymerization is carried out at a molar ratio of the chain transfer agent to the monomer ranging from 1:1 to 1:10000.

The solvent for RAFT polymerization is selected based the requirements of monomer solubility and a normal boiling point compatible with the polymerization temperature. The solvent used in the RAFT polymerization may be toluene, dioxane, TUF, chloroform, cyclohexane, dimethyl sulfoxide, dimethyl formamide, acetone, acetonitrile, n-butanol, n-pentanol, chlorobenzene, dichloromethane, diethyl ether, tert-butanol, 1,2,-dichloroethylene, diisopropyl ether, ethanol, ethylacetate, ethylmethylketone, heptane, hexane, isopropylalcohol, isoamylalcohol, methanol, pentane, n-propyl alcohol, pentachloroethane, 1, 1,2,2,-tetrachloroethane, 1, 1,1,-trichloroethane, tetrachloroethylene, tetrachloromethane, tnchloroethylene, water, xylene, benzene, nitromethane, glycerol, or a mixture thereof. The solvent can further include stabilizers, surfactants, or dispersants.

The branched-chain polymers can include those based on the monomers monomer selected from the group consisting of styrene, vinyl benzyl chloride, 2-vinyl pyridine, 4-vinyl pyridine, methyl acrylate, ethyl acrylate, methyl methacrylate, ethyl methacrylate, butyl methacrylate, butyl acrylate, acrylic acid, methacrylic acid, 2-hydroxyethyl methacrylate, 2-hydroxyethyl acrylate, 2-hydroxypropyl acrylate, 2-hydroxypropyl methacrylate, acrylamide, methacrylamide, dimethyl acrylamide, dimethyl(meth)acrylamide, allyl methacrylate, dimethylaminoethyl methacrylate, dimethylaminoethyl acrylate, diethylaminoethyl methacrylate, diethylaminoethyl acrylate, divinyl benzene, ethyleneglycol dimethacrylate, ethyleneglycol diacrylate, triethylene glycol dimethacrylate, tetraethyleneglycol dimethacrylate, triethyleneglycol diacrylate, tetraethyleneglycol diacrylate, 1,3,5-triallyl-1,3,5-triazine-2,4,6(1H,3H,5H)-trione, dodecane thiol, hexane thiol, 2-mercaptoethanol and fragments arising from azobis isobutyronitrile, di-f-butyl peroxide, and f-butyl peroxybenzoate.

The RAFT polymerization can be used to precisely control the molecular weight and chain length of the branched-chain polymers. For example, in some aspects the branched-chain polymer has a number average molecular weight ($M_n$) of about 1 kg mol$^{-1}$ to about 250 kg mol$^{-1}$, about 1 kg mol$^{-1}$ to about 100 kg mol$^{-1}$, about 5 kg mol$^{-1}$ to about 75 kg mol$^{-1}$, about 5 kg mol$^{-1}$ to about 50 kg mol$^{-1}$, about 25 kg mol$^{-1}$ to about 75 kg mol$^{-1}$, about 25 kg mol$^{-1}$ to about 250 kg mol$^{-1}$, or about 5 kg mol$^{-1}$, about 25 kg mol$^{-1}$, about 50 kg mol$^{-1}$, or about 75 kg mol$^{-1}$. The polymers can also be made with low polydispersity index (PDI), such as about 2.0, about 1.5, about 1.3, about 1.15, about 1.1, about 1.05, or less.

The branched-chain polymers useful herein will generally have a glass transition temperature above room temperature. In some aspects, the branched-chain polymer has a glass transition temperature ($T_g$) of about 35° C., about 40° C., about 45° C., about 50° C., about 55° C., or more, e.g. about 40° C. to about 120° C., about 40° C. to about 100° C., about 45° C. to about 100° C., or about 45° C. to about 90° C.

Binder

The methods include ink-jet depositing a binder onto a powder layer to form the article in a layer-by-layer approach. Any number of suitable binders can be used including a branched-chain polymer. The binder can include branched-chain analogues of the same polymers as are used in conventional powder processing methods. The binder can include a branched-chain polymer described herein.

The binder will include a solvent. Solvents for most of the binder polymers are known, for example, methylene chloride or other organic solvents can be used for polymers soluble in organic solvents. Some binder polymers such as PVP or polysaccharide polymers are also soluble in both aqueous and organic solvents, although an aqueous solution is preferred if denaturation of a protein component to be avoided.

Applicants have found that the concentration of the branched-chain polymer can be beneficially increased in the binders as compared to the otherwise same polymer having a linear backbone. This can allow for improved densities of the printed articles as well as improved structural integrity. In some aspects, the concentration of the branched-chain polymer in the binder is above a maximum printable concentration of the otherwise same binder and under the otherwise same conditions except replacing the branched-chain polymer with a linear-chain polymer of the same repeat units and having the same $M_n$. The maximum jettable concentration, for a given polymer, is defined as the maximum concentration of that polymer where a droplet can be jetted out of the nozzle, where complete failure and partial failure of droplet ejection is both treated as a negative result.

The binder can include a number of other additives such as surfactants or dispersants. In some aspects, when the article include a table or other oral dosage form, the binder may include a drug or other pharmaceutical or nutraceutical active agent that is deposited onto the powder along with the binder polymer. Suitable solvents may include water, alcohol, or certain organic solvents considered safe for consumption. The binder can include additional additives such as antioxidants, glycerin, surfactants, emulsifiers, sweeteners, preservatives, and the like.

Powders

The methods include binder jetting applicable to a variety of powders. The powders can also include additives commonly used in powders for resin printing. For example, the powders can include additives such as silica to improve spreadability. Other additives can include various fillers, pigments, dyes, flame retardants, preservatives, sizing agents, and the like.

The size of the particles in the powder can impact the article properties, and methods exist for controlling and selecting a particle size. For example, the particle size can be controlled via sifting to specific particle diameters and/or via the use of various sizing agents. The particle size can also depend upon the specific material in the powder as well as the specific requirements of the article to be produced. In some aspects, the average size (diameter) of the particles is about 0.2 μm to about 200 μm, about 0.2 μm to about 20 μm, about 0.2 μm to about 10 μm, about 10 μm to about 200 μm, about 10 μm to about 100 μm, about 50 μm to about 150 μm, or about 60 μm to about 120 μm.

The powders can include polymer powders and other organic powders. The powders can include metal powders. The powders can include ceramic and glass ceramic powders. In some aspects, the powders include drugs and other active agents for manufacturing tablets and other oral dosage forms. Metal powders can include, for example, metals such as silver, nickel, iron, cobalt, tungsten, molybdenum, other metals, and alloys and mixtures thereof.

Articles

The methods and binders provided herein can be used to make a variety of articles. The articles can include structural materials made from metals or metal alloys. The articles can also include other articles such as metal parts, injection molding tooling, casting shells, and structural ceramics.

However, in certain preferred aspects the article is a tablet or oral dosage form. By incorporating drugs or other active agents into the tablet, personalized tablets can be prepared having specific dosages and dosage release profiles. In some aspects, the table is a multi-layer tablet. Applicants have found they can produce tablets having improved compressive strength. For example, tablets can be prepared having a compressive strength of 0.4 MPa, 0.5 MPa, 0.7 MPa, 0.8 MPa, 0.9 MPa, 1.0 MPa, or higher. Tablets are demonstrated having compression strength of about 0.8 MPa to about 1.8 MPa or higher.

There are few limitations on the bioactive agents that can be incorporated into the devices, although those materials which can be processed into particles using spray drying, atomization, grinding, or other standard methodology, or those materials which can be formed into emulsifications, microparticles, liposomes, or other small particles, and which remain stable chemically and retain biological activity in a polymeric matrix, are preferred. Those bioactive agents which can be directly dissolved in a biocompatible solvent can be readily processed. Bioactive agents also include compounds having principally a structural role, for example, hydroxyapatite crystals in a matrix for bone regeneration. The particles may have a size of greater than or less than the particle size or the polymer particles used to make the matrix.

Examples generally include proteins and peptides, polysaccharides, nucleic acids, lipids, and non-protein organic and inorganic compounds, referred to herein as "bioactive agents" unless specifically state otherwise. These materials have biological effects including, but not limited to anti-inflammatories, antimicrobials, anti-cancer, antivirals, hormones, antioxidants, channel blockers, growth factor, cytokines, lymphokines, and vaccines. It is also possible to incorporate materials not exerting a biological effect such as air, radiopaque materials such as barium, or other imaging agents.

Aspects of the Disclosure

The present disclosure will be better understood upon reading the following Aspects which should not be confused with the claims. Any of the numbered Aspects below can, in some instances, be combined with other aspects described elsewhere herein even though such combination may not be expressly disclosed as such herein.

Aspect 1. A method of binder jetting of a 3D-printed article in a layer-by-layer fashion, the method comprising (a) providing a first layer of powder; (b) ink-jet depositing a binder onto the first layer of the powder in a pattern that corresponds to a first layer of the article, wherein the binder comprises a branched-chain polymer and a solvent; (c) providing a subsequent layer of powder onto either the first layer of powder or a previous layer of powder; (d) ink-jet depositing the binder onto the subsequent layer of powder in a pattern that corresponds to a subsequent layer of the article; and repeating steps (c) and (d) to form the article layer-by-layer by forming each subsequent layer of the article on a previous layer of the article.

Aspect 2. The method according to any one of Aspects 1-19, wherein the concentration of the branched-chain polymer in the binder is above a maximum printable concentration of the otherwise same binder and under the otherwise same conditions except replacing the branched-chain polymer with a linear-chain polymer of the same repeat units and having the same $M_n$.

Aspect 3. The method according to any one of Aspects 1-19, wherein the branched-chain polymer has a $M_n$ of about 1 kg mol$^{-1}$ to about 250 kg mol$^{-1}$, about 1 kg mol$^{-1}$ to about 100 kg mol$^{-1}$, about 5 kg mol$^{-1}$ to about 75 kg mol$^{-1}$, about 5 kg mol$^{-1}$ to about 50 kg mol$^{-1}$, about 25 kg mol$^{-1}$ to about 75 kg mol$^{-1}$, about 25 kg mol$^{-1}$ to about 250 kg mol$^{-1}$, or about 5 kg mol$^{-1}$, about 25 kg mol$^{-1}$, about 50 kg mol$^{-1}$, or about 75 kg mol$^{-1}$.

Aspect 4. The method according to any one of Aspects 1-19, wherein the branched-chain polymer has a polydispersity index (PDI) of about 1.0 to about 30.0, about 1.0 to about 20.0, about 1.0 to about 10.0, about 10.0 to about 20.0, about 20.0 to about 30.0, or about 2.0, about 1.5, about 1.3, about 1.15, about 1.1, about 1.05, or less.

Aspect 5. The method according to any one of Aspects 1-19, wherein the branched-chain polymer has a glass transition temperature (TO of about 35° C., about 40° C., about 45° C., about 50° C., about 55° C., or more, e.g. about 40° C. to about 300° C., about 40° C. to about 250° C., about 40° C. to about 200° C., about 40° C. to about 120° C., about 40° C. to about 100° C., about 45° C. to about 300° C., about 45° C. to about 200° C., about 45° C. to about 100° C., or about 45° C. to about 90° C.

Aspect 6. The method according to any one of Aspects 1-19, wherein the branched-chain polymer is selected from the group consisting of a short-chain branched polymer; a long-chained branched polymer; a hyper-branched polymer, a cyclic polymer; a comb-type polymer; a 3-arm star type polymer, a 4-arm star type polymer, a dendritic polymer, and a combination thereof.

Aspect 7. The method according to any one of Aspects 1-19, wherein the branched-chain polymer is selected from the group consisting of a homopolymer, a random or statistical copolymer, a block copolymer, and a combination thereof.

Aspect 8. The method according to any one of Aspects 1-19, wherein the branched-chain polymer is selected from the group consisting of polycarbonates, polyolefins, polymethacrylates, polystyrenes, polyamides, polyurethanes, poly(ethylene terephthalate), poly(lactic acid), poly(glycolic acid), polyhydroxbutyrate, polydioxanones (e.g., 1,4-dioxanone), δ-valerolactone, 1-dioxepanones (e.g., 1,4-dioxepan-2-one and 1,5-dioxepan-2-one), polyesters, poly(ethylene glycol), poly(ethylene oxides), polyacrylamides, cellulose esters, fluoropolymers, vinyl polymers, silk, collagen, alginate, chitin, chitosan, hyaluronic acid, chondroitin sulfate, glycosaminoglycans, poly(hydroxyethyl methacrylate), polyvinylpyrrolidone, poly(vinyl alcohol), poly(acrylic acid), polyacetate, polycaprolactone, poly(propylene, glycol)s, poly(amino acids), copoly (ether-esters), poly(alkylene oxalates), polyamides, poly(iminocarbonates), polyoxaesters, polyorthoesters, polyphosphazenes, polypeptides and copolymers, block copolymers, homopolymers, blends and combinations thereof.

Aspect 9. The method according to any one of Aspects 1-19, wherein the branched-chain polymer is present at a concentration from about 3% to about 30%, about 3% to about 20%, about 3% to about 15%, or about 5% to about 15% by weight based upon a total weight of the binder.

Aspect 10. The method according to any one of Aspects 1-19, wherein the binder further comprises a surfactant.

Aspect 11. The method according to any one of Aspects 1-19, wherein the surfactant is present in an amount from about 1% to about 5% by weight based upon a total weight of the binder.

Aspect 12. The method according to any one of Aspects 1-19, wherein the solvent comprises water or other aqueous solvents, organic solvents, and a mixture thereof.

Aspect 13. The method according to any one of Aspects 1-19, wherein the binder has a solution viscosity at 1000 s$^{-1}$ from about 0.5 mPa·s to about 5 mPa·s, about 0.8 m·Pas to about 4.7 m·Pas, or about 1.0 mPa·s to about 4.5 mPa·s.

Aspect 14. The method according to any one of Aspects 1-19, wherein the branched-chain polymer is made via a living radical polymerization of a monomer selected from the group consisting of styrene, vinyl benzyl chloride, 2-vinyl pyridine, 4-vinyl pyridine, methyl acrylate, ethyl acrylate, methyl methacrylate, ethyl methacrylate, butyl methacrylate, butyl acrylate, acrylic acid, methacrylic acid, 2-hydroxyethyl methacrylate, 2-hydroxyethyl acrylate, 2-hydroxypropyl acrylate, 2-hydroxypropyl methacrylate, acrylamide, methacrylamide, di methyl acrylamide, di methyl(meth)acrylamide, allyl methacrylate, dimethylaminoethyl methacrylate, di methylaminoethyl acrylate, diethylaminoethyl methacrylate, diethylaminoethyl acrylate, divinyl benzene, ethyleneglycol dimethacrylate, ethyleneglycol diacrylate, triethylene glycol di methacrylate, tetraethyleneglycol dimethacrylate, triethyleneglycol diacrylate, tetraethyleneglycol diacrylate, 1,3,5-triallyl-1,3,5-triazine-2,4,6(1H, 3H,5H)-trione, dodecane thiol, hexane thiol, 2-mercaptoethanol and fragments arising from azobis isobutyronitrile, di-f-butyl peroxide, and f-butyl peroxybenzoate.

Aspect 15. The method according to any one of Aspects 1-19, wherein powder is selected from the group consisting of a ceramic powder, a polymer powder, a carbon powder, a metal powder, a drug or other bioactive compound.

Aspect 16. The method according to any one of Aspects 1-19, wherein powder includes ceramic powders such as alumina, silicon carbide, silicon nitride and barium titanate.

Aspect 17. The method according to any one of Aspects 1-19, wherein the powder includes metal powders such as silver, nickel, iron, cobalt, tungsten, molybdenum, other metals, and alloys and mixtures thereof.

Aspect 18. The method according to any one of Aspects 1-19, wherein the powder includes a carbon powder such as carbon black, carbon nanotubes, graphene, graphite, and other carbon nanoparticles.

Aspect 19. The method according to any one of Aspects 1-19, wherein the powder includes a drug or other bioactive compound such as small molecule active agents, proteins and peptides, polysaccharides, nucleic acids, lipids, and non-protein organic and inorganic compounds.

Aspect 20. A printable binder capable of being printed through an ink-jet nozzle, the binder comprising a branched-chain polymer and a solvent, wherein the concentration of the branched-chain polymer in the binder is above a maximum printable concentration of the otherwise same binder and under the otherwise same conditions except replacing the branched-chain polymer with a linear-chain polymer of the same repeat units and having the same $M_n$.

Aspect 21. The printable binder according to any one of Aspects 20-32, wherein the branched-chain polymer has a $M_n$ of about 1 kg mol$^{-1}$ to about 250 kg mol$^{-1}$, about 1 kg mol$^{-1}$ to about 100 kg mol$^{-1}$, about 5 kg mol$^{-1}$ to about 75 kg mol$^{-1}$, about 5 kg mol$^{-1}$ to about 50 kg mol$^{-1}$, about 25 kg mol$^{-1}$ to about 75 kg mol$^{-1}$, about 25 kg mol$^{-1}$ to about 250 kg mol$^{-1}$, or about 5 kg mol$^{-1}$, about 25 kg mol$^{-1}$, about 50 kg mol$^{-1}$, or about 75 kg mol$^{-1}$.

Aspect 22. The printable binder according to any one of Aspects 20-32, wherein the branched-chain polymer has a polydispersity index (PDI) of about 1.0 to about 30.0, about 1.0 to about 20.0, about 1.0 to about 10.0, about 10.0 to about 20.0, about 20.0 to about 30.0, or about 2.0, about 1.5, about 1.3, about 1.15, about 1.1, about 1.05, or less.

Aspect 23. The printable binder according to any one of Aspects 20-32, wherein the branched-chain polymer has a glass transition temperature ($T_g$) of about 35° C., about 40° C., about 45° C., about 50° C., about 55° C., or more, e.g. about 40° C. to about 300° C., about 40° C. to about 250° C., about 40° C. to about 200° C., about 40° C. to about 120° C., about 40° C. to about 100° C., about 45° C. to about 300° C., about 45° C. to about 200° C., about 45° C. to about 100° C., or about 45° C. to about 90° C.

Aspect 24. The printable binder according to any one of Aspects 20-32, wherein the branched-chain polymer is selected from the group consisting of a short-chain branched polymer; a long-chained branched polymer; a hyperbranched polymer, a cyclic polymer; a comb-type polymer; a 3-arm star type polymer, a 4-arm star type polymer, a dendritic polymer, and a combination thereof.

Aspect 25. The printable binder according to any one of Aspects 20-32, wherein the branched-chain polymer is selected from the group consisting of a homopolymer, a random or statistical copolymer, a block copolymer, and a combination thereof.

Aspect 26. The printable binder according to any one of Aspects 20-32, wherein the branched-chain polymer is selected from the group consisting of polycarbonates, polyolefins, polymethacrylates, polystyrenes, polyamides, polyurethanes, poly(ethylene terephthalate), poly(lactic acid), poly(glycolic acid), polyhydroxbutyrate, polydioxanones (e.g., 1,4-dioxanone), δ-valerolactone, 1-dioxepanones (e.g., 1,4-dioxepan-2-one and 1,5-dioxepan-2-one), polyesters, poly(ethylene glycol), poly(ethylene oxides), polyacrylamides, cellulose esters, fluoropolymers, vinyl polymers, silk, collagen, alginate, chitin, chitosan, hyaluronic acid, chondroitin sulfate, glycosaminoglycans, poly(hydroxyethyl methacrylate), polyvinylpyrrolidone, poly(vinyl alcohol), poly(acrylic acid), polyacetate, polycaprolactone, poly(propylene, glycol)s, poly(amino acids), copoly (ether-esters), poly(alkylene oxalates), polyamides, poly(iminocarbonates), polyoxaesters, polyorthoesters, polyphosphazenes, polypeptides and copolymers, block copolymers, homopolymers, blends and combinations thereof.

Aspect 27. The printable binder according to any one of Aspects 20-32, wherein the branched-chain polymer is present at a concentration from about 3% to about 30%, about 3% to about 20%, about 3% to about 15%, or about 5% to about 15% by weight based upon a total weight of the binder.

Aspect 28. The printable binder according to any one of Aspects 20-32, wherein the binder further comprises a surfactant.

Aspect 29. The printable binder according to any one of Aspects 20-32, wherein the surfactant is present in an amount from about 1% to about 5% by weight based upon a total weight of the binder.

Aspect 30. The printable binder according to any one of Aspects 20-32, wherein the solvent comprises water or other aqueous solvents, organic solvents, and a mixture thereof.

Aspect 31. The printable binder according to any one of Aspects 20-32, wherein the binder has a solution viscosity at 1000 s$^{-1}$ from about 0.5 mPa·s to about 5 mPa·s, about 0.8 mPa·s to about 4.7 mPa·s, or about 1.0 mPa·s to about 4.5 mPa·s.

Aspect 32. The printable binder according to any one of Aspects 20-32, wherein the branched-chain polymer is made via a living radical polymerization of a monomer selected from the group consisting of styrene, vinyl benzyl chloride, 2-vinyl pyridine, 4-vinyl pyridine, methyl acrylate, ethyl acrylate, methyl methacrylate, ethyl methacrylate, butyl methacrylate, butyl acrylate, acrylic acid, methacrylic acid, 2-hydroxyethyl methacrylate, 2-hydroxyethyl acrylate, 2-hydroxypropyl acrylate, 2-hydroxypropyl methacrylate, acrylamide, methacrylamide, dimethyl acrylamide, dimethyl (meth)acrylamide, allyl methacrylate, dimethylaminoethyl methacrylate, di methylaminoethyl acrylate, diethylaminoethyl methacrylate, diethylaminoethyl acrylate, divinyl benzene, ethyleneglycol dimethacrylate, ethyleneglycol diacrylate, triethylene glycol di methacrylate, tetraethyleneglycol dimethacrylate, triethyleneglycol diacrylate, tetraethyleneglycol diacrylate, 1,3,5-triallyl-1,3,5-triazine-2,4,6(1H, 3H,5H)-trione, dodecane thiol, hexane thiol, 2-mercaptoethanol and fragments arising from azobis isobutyronitrile, di-f-butyl peroxide, and f-butyl peroxybenzoate.

Aspect 33. An article prepared by a method according to any one of Aspects 1-19.

Aspect 34. The article according to Aspect 33, wherein the article is a tablet or oral dosage form.

EXAMPLES

Now having described the embodiments of the present disclosure, in general, the following Examples describe some additional embodiments of the present disclosure. While embodiments of the present disclosure are described in connection with the following examples and the corresponding text and figures, there is no intent to limit embodiments of the present disclosure to this description. On the contrary, the intent is to cover all alternatives, modifications, and equivalents included within the spirit and scope of embodiments of the present disclosure.

Example 1. Four-Arm Star Poly(Vinyl Pyrrolidone) for Aqueous Binder Jetting Additive Manufacturing of Personalized Dosage Tablets Materials (1-Bromoethyl)benzene, 1,2,4,5-tetrakis(bromomethyl)benzene, Tween 20®, silica, acetaminophen, methyl benzoate (99%), and 40 k PVP were purchased from Sigma Aldrich and used without further purification. N-Vinyl pyrrolidone (NVP) was filtered through a basic aluminum column to remove inhibitor before use. Azobisisobutyronitrile (AIBN) was purchased from Sigma Aldrich and recrystallized from methanol before use. O-ethyl xanthic acid potassium salt was dried at 40° C. under high vacuum (0.1 mbar) for 24 h before use. Diethyl ether, deionized (DI) water, extra dry acetone (99.9%) and methanol were purchased from Acros and used without further purification. Lactose 315 was purchased from Foremost Farms USA and Kroger Inc. powdered confectioners' sugar (5-30 μm particle size) was purchased from the local store, and both were dried at 60° C. under vacuum for 24 h and sifted to break up aggregates before use.

Synthetic Methods

O-Ethyl-S-(1-ethylphenyl) dithiocarbonate

The synthesis of O-ethyl-S-(1-ethylphenyl) dithiocarbonate was adopted from Stenzel et. al. (*J. Polym. Sci. Part A Polym. Chem.* 2006, 44 (15), 4372-4383). Briefly, O-ethyl xanthic acid potassium salt (5.24 g, 0.033 mol, 1 eq.) was dissolved in 60 mL of dry acetone and purged with nitrogen for 30 min. 1-Bromo ethyl benzene (6.03 g, 0.033 mol, 1 eq.) was added dropwise over 10 min and the reaction stirred for 24 h. Potassium bromide was removed through filtration and the acetone was removed at reduced pressure. The viscous yellow product was used without further purification at 89% yield. The structure was confirmed using $^1$H and $^{13}$C NMR spectroscopy. $^1$H NMR (CDCl$_3$): 1.43 (3H, t), 1.57 (3H, d), 4.62 (2H, q), 4.87 (1H, q), 7.36 (5H, m). $^{13}$C NMR (CDCl$_3$): 13.6, 21.7, 49.2, 69.6, 127.1-128.7, 141.8, 213.0.

1,2,4,5-Tetrakis[(O-ethylxanthyl)methyl]benzene

The synthesis of 1,2,4,5-tetrakis[(O-ethylxanthyl)methyl]benzene was adopted from Stenzel et. al. (*J. Polym. Sci. Part A Polym. Chem.* 2006, 44 (15), 4372-4383). Briefly, O-ethyl xanthic acid potassium salt (5.24 g, 0.033 mol, 1 eq.) was dissolved in 100 mL of dry acetone and the reaction vessel was purged with N$_2$ for 30 min. Next, 1,2,4,5-tetrakis(bromomethyl)benzene (3.66 g, 0.0082 mol, 0.25 eq.) was added and the reaction was allowed to stir for 24 h. Potassium bromide was removed through filtration and the acetone was removed at reduced pressure. The residual pale-yellow solid was dissolved in chloroform and purified through column chromatography with 4/1 v/v hexane/ethyl acetate as the mobile phase (55% yield). The structure was confirmed using $^1$H and $^{13}$C NMR spectroscopy. $^1$H NMR (CDCl$_3$): 1.42 (12H, t), 4.67 (8H, q), 4.38 (8H, s), 7.38 (2H, s). $^{13}$C NMR (CDCl$_3$): 13.7, 37.3, 70.2, 132.9, 134.1, 213.1.

RAFT Polymerization Kinetics of N-Vinyl Pyrrolidone

As an example procedure for linear PVP, a stock batch of NVP (35 g, 0.315 mol), O-ethyl-S-(1-ethylphenyl) dithiocarbonate (0.16 g, 7·10$^{-4}$ mol), and AIBN (11.4 mg, 7·10$^{-5}$ mol) were mixed and split into six 50-mL round-bottomed flasks and purged with nitrogen for 30 min. The molar ratio of NVP:CTA:AIBN was 450:1:0.1. The mixtures were allowed to react at 60° C. for 2, 4, 8, 12, 16, and 24 h. $^1$H NMR spectroscopy of the crude product determined conversion. The reaction mixture was precipitated twice into diethyl ether and stirred for 20 min. Aqueous SEC determined absolute molecular weight of each system.

Binder Preparation

As a general procedure, polymer was placed in DI water and stirred with a magnetic stir bar for 10-15 min until the polymer was fully dissolved. 1 wt % of Tween 20® was subsequently added to tune surface tension and the mixture was stirred for an additional 30 min. After any bubbles dissipated, the binder was syringed through a 2.2 μm filter and used immediately.

Powder Preparation

The lactose was first sifted to <80 μm. Next, a combination of lactose powdered sugar, and silica were placed in a cylindrical container and mixed on a Waverly TR-E roller for 20 min. The powder was placed in the ZCorp printer powder bed and the roller created a flat surface to ensure aggregation did not occur. A ratio of 4:1 lactose:powdered sugar wt:wt was used for every tablet system, and 5 wt % of silica was added to increase spreadability.

Analytical

Aqueous SEC was conducted in a 54/23/23 v/v/v mixture of DI water, methanol, and glacial acetic acid with 0.1 M sodium acetate at a pH=4. A Waters Breeze Aqueous SEC with Wyatt miniDAWN treos light scattering and Waters 2414 RI detector with poly(ethylene oxide) (PEO) standards determined absolute molecular weight of each system. Solution viscosity experiments were performed on a DHR Discovery Rheometer in steady state mode with a Peltier plate and concentric cylinder geometries at 20° C. where n=3. Shear sweeps were conducted from 1-1200 s$^{-1}$ at a 300 or 5000 μm gap with a solvent trap equipped with slightly saturated sponges. Pendant drop experiments were performed on a FTA 200 Contact Angle Analyzer with a 3 mL 30-gauge syringe. FTA Operator's Software was used to fit the droplet shape to the Young-Laplace equation and yield the liquid-to-air interface surface tension where n=4. Density of the binder solutions was determined through micropipetting 1 mL of binder and subsequently weighing the sample, n=5. Compression testing was performed on each printed tablet with a crosshead motion of 1.3 mm min$^{-1}$ on an Instron 4204 with a 1 kN load cell, n=10. Young's modulus was calculated from the slope of the linear elastic region of the stress vs. strain curve, and compressive strength was denoted as the largest stress at the yield point. $^1$H NMR spectroscopy was conducted on a Varian Unity 400 MHz in D$_2$O and DMSO$_{d6}$. Scanning electron microscopy (SEM) images were taken on a Joel NeoScope JCM-5000 Benchtop SEM, under high vacuum at a 10 kV accelerating voltage. A micromeritics AccuPyc II 1340 Gas Pycnometer measured apparent density using ultra-pure Helium gas. The porosity of the tablets was calculated using Eqn. 5, where the bulk density was calculated using the weight and dimensional measurements of each sample.

$$\text{porosity \%} = \left(1 - \frac{\text{bulk density}}{\text{apparent density}}\right) \times 100 \qquad \text{Eqn. 5}$$

Binder Jetting

All printing was conducted on a Z-Corp Spectrum Z510 3D printer with a HP 11 printhead (11 μm nozzle radius). To print the tablets, a solid model of a 12 mm diameter and 3 mm thick cylindrical tablet was used and uploaded onto the Zprint software and printed with a layer thickness of 0.005 inches at 100% saturation. After the print was complete, the parts were left in the powder bed for 40 min at 60° C. and subsequently removed from the printer.

Water Dissolution

To test the water dissolution of the binder jetted tablets, each tablet was added to a beaker of DI water at 37° C. in 1 mg mL$^{-1}$ with a magnetic stir bar. Complete dissolution was denoted when the solution clarified or if the tablet completely broke apart into single particles.

API Determination $^1$H NMR spectroscopy on a Varian Unity 400 MHz in D$_2$O determined the amount of API in each tablet. As an example, the 10 wt % API loaded tablets were printed and analyzed as follows. Lactose, powdered sugar, and acetaminophen (API) were all dried at 60° C. for 24 h before use. The powders were mixed at a ratio of lactose:powdered sugar:acetaminophen 75:15:10 wt:wt:wt and subsequently printed. Samples from the four quadrants and top of and bottom of the tablets were isolated about dissolved in DMSO$_{d6}$. A known amount of methyl benzoate was added to each mixture as an internal standard. To determine the amount of acetaminophen, the integration of the aromatic peaks on methyl benzoate (8.0-8.2, 3H, m) was compared to the aromatic peaks on acetaminophen (6.7, 2H, m; 7.4, 2H, m). An average of each quadrant and the top and bottom of the tablets was used to determine the total acetaminophen amount to ensure an even distribution of API throughout the tablet.

Statistical Analysis

Using Minitab 18 statistical software, an ANOVA test was performed followed by a Tukey's HSD to determine statistical differences between groups with a 95% confidence.

Results and Discussion

Synthesis and Structural Characterization of Linear and 4-arm Star PVP

RAFT polymerization yielded a series of precise number-average molecular weight (M$_n$), linear and 4-arm star PVP for subsequent use in water-based binder formulations. RAFT polymerization provides products without residual heavy metal catalysts and other toxic components compared to other reservable-deactivation radical polymerization methods, which deems this method appropriate for pharmaceutical applications. (Boyer, C.; et al., *Chem. Rev.* 2009, 109 (11), 5402-5436; Lowe, A. B.; McCormick, C. L., *Prog. Polym. Sci.* 2007, 32 (3), 283-351; Nicolas, J.; Mantovani, G.; Haddleton, D. M., *Macromol. Rapid Commun.* 2007, 28 (10), 1083-1111) This study utilized a specific xanthate-containing chain transfer agent (CTA) to yield controlled molecular weight linear and 4-arm star PVP, depicted in Scheme 1A and 1B, respectively, (*J. Polym. Sci. Part A Polym. Chem.* 2006, 44 (15), 4372-4383) A kinetic study of each system revealed first-order kinetics over 24 h with a final conversion of 58% and 45% for the linear and 4-arm star CTAs, respectively. N-vinyl pyrrolidone represents a less activated monomer, which subsequently creates a highly reactive propagating radical. A xanthate moiety in the CTA reduces the double bond character compared to a typical dithioate functional group with an adjacent carbon, which helps control the polymerization. Additionally, this CTA contained an ethyl benzyl as a more stable radical-containing leaving group, compared to a common acetate group, which was also hypothesized to help control polymerization. Using this system, a range of M$_n$ of linear and 4-arm star PVP were chosen to explore the solution properties of each system and the molecular weight effects on the physical properties of printed tablets.

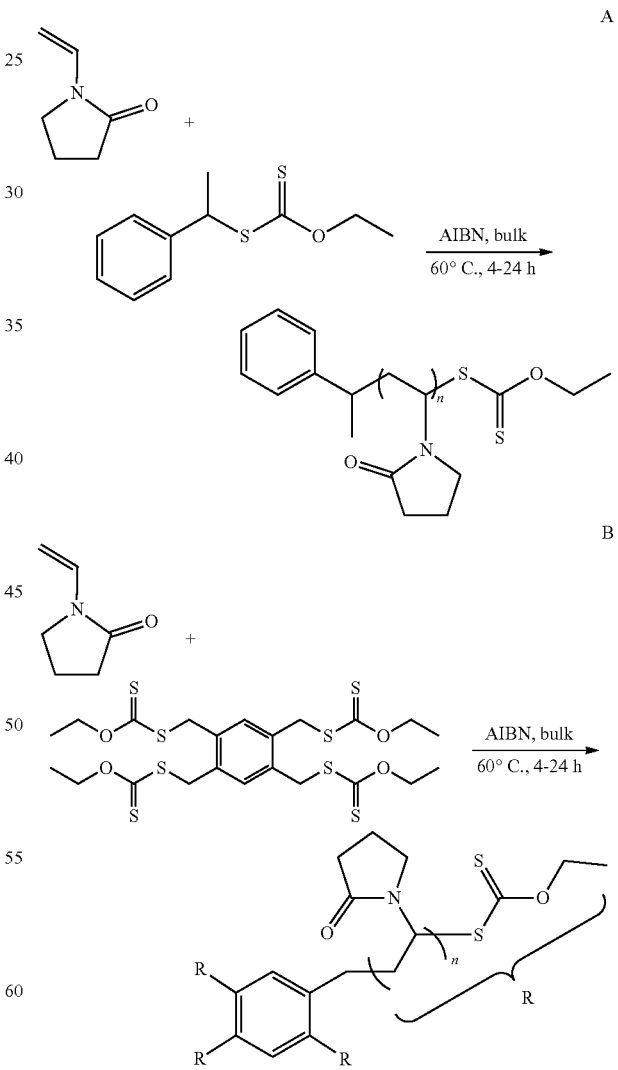

Scheme 1. Reversible addition-fragmentation chain-transfer (RAFT) polymerization yielded (A) linear and (B) 4-arm star poly(vinyl pyrrolidone) (PVP).

Aqueous SEC-MALLS revealed the $M_n$ targets of 5, 25, and 50 kg mol$^{-1}$ were achieved for the linear and 4-arm star PVP systems. FIGS. 1A and 1B depicts the light scattering traces of linear and 4-arm star PVP, respectively. Light scattering and refractive index detection confirmed absolute molecular weight of approximately 5, 25, and 50 kg mol$^{-1}$ linear and 4-arm star PVP with all dispersities (Đ) below 1.15, which indicated control of molecular weight owing to the controlled RAFT polymerization process (Table 1).

TABLE 1

Summary of Aqueous SEC data of linear and 4-arm star polyvinylpyrrolidone (PVP).

| Topology | $M_n$ (kg mol$^{-1}$) | $M_w$ (kg mol$^{-1}$) | Đ |
|---|---|---|---|
| Linear | 5.1 | 5.7 | 1.12 |
| Linear | 24.6 | 26.6 | 1.08 |
| Linear | 48.8 | 55.6 | 1.14 |
| 4-Arm Star | 4.8 | 5.5 | 1.14 |
| 4-Arm Star | 25.2 | 27.5 | 1.09 |
| 4-Arm Star | 49.5 | 54.9 | 1.11 |

Binder Solution Properties

Formulations at 3, 6, and 9 wt % solutions in DI water of each $M_n$ of linear and 4-arm star PVP afforded a range of concentrations to not only compare physical tablet properties using increasing wt % polymer, but also demonstrated the ability to jet 4-arm star PVP at higher concentrations compared to linear analogs at the same $M_n$. The addition of 1 wt % Tween 200, a surfactant, to each combination lowered the surface tension into a jettable range (41.6-47.9 mN m$^{-1}$). Without the addition of Tween 20®, the binders did not jet from the nozzle, owing to insufficient energy to eject a drop. Density measurements of each binder did not reveal a trend and exhibited similar densities as water, 1.02-1.1 g mL$^{-1}$.

Figure 2A:
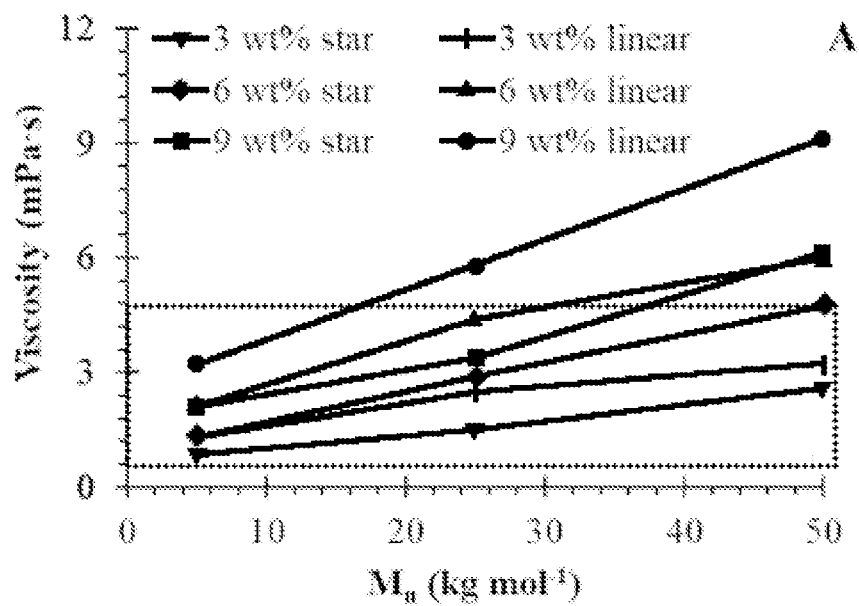
FIGS. 2A-2B are graphs of the solution viscosities (FIG. 2A) measured at 1000 s$^{-1}$ and of Z parameters (FIG. 2B) as a function of the $M_n$=5, 25, and 50 kg mol$^{-1}$ measured for 3, 6, and 9 wt % solutions of linear and 4-arm star poly(vinyl pyrrolidone) (PVP).

FIG. 2A depicts the solution viscosities in DI water at 1000 s$^{-1}$, and the estimated shear rate of jetting[11], of linear and 4-arm star PVP as a function of $M_n$ and concentration. Each sample exhibited Newtonian behavior over the measured frequency range of 1-1200 s$^{-1}$. Increasing concentration and increasing molecular weight for all samples resulted in an increase in solution viscosity, where each data point depicted is statistically different. As concentration increased, the polymer chains exhibited a greater frictional force in solution and began to interact, thus increasing the viscosity. As molecular weight increased, the polymer chains overlap and entangle, which also caused an increase in viscosity. Across all samples, the 4-arm star PVP exhibited lower solution viscosities at all concentrations compared to the corresponding linear analogs at the same $M_n$. This is attributed to star polymers experiencing smaller radii of gyration ($R_g$) compared to linear analogs. These physical properties combined with a compact shape, decreased friction in solution, and decreased entanglements and interactions with other polymer chains resulted in decreased solution viscosities. This report discusses using lower solution viscosities to allow for a larger concentration of adhesive polymer to be jetted, which thus produced a stronger tablet in certain combinations.

Figure 2B:
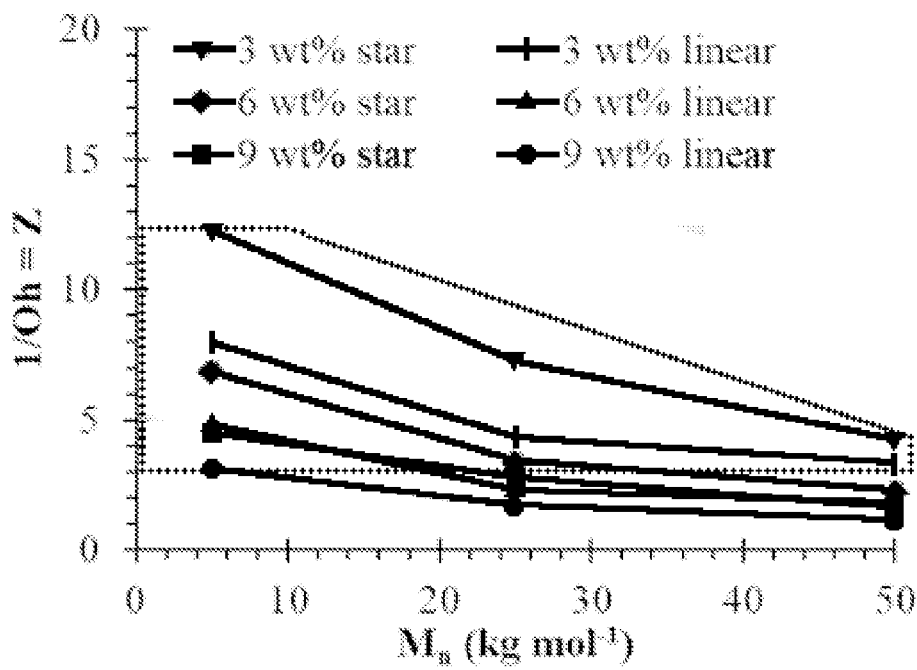

FIG. 2B depicts the Z parameters of linear and 4-arm star PVP as a function of $M_n$ and concentration where α=11 μm. The Z parameter trends followed similar trends as the solution viscosity data, which suggests tuning solution viscosity had an impact on jettability in this system. Because increasing polymer concentrations increased tablet strength, the goal was to achieve the highest concentration possible. The 4-arm star analogs exhibited lower Z parameters compared to the linear analogs, which enabled the ability to print them at higher concentrations.

FIGS. 2A and 2B depict areas enclosed in dotted lines representing successfully jetted binder formulations. Based on this comprehensive study, binders with solution viscosities from 0.8 to 4.7 mPa·s and Z parameters from 2.2 to 12.4 were jettable on this specific printing system. Binders exhibiting >4.7 mPa·s solution viscosities either partially ejected from the printhead, creating inconsistent layer saturation, or did not eject from the nozzle. This reported jettable range does not align with the accepted jettable Z parameter and solution viscosity ranges, 1 to 10 and 1 to 20 mPa·s, respectively. It is important to note that the previously reported range was determined using a piezoelectric printhead with ceramic-containing binders. These differences arise from the different jetting mechanisms of thermal and piezoelectric printheads and the rheological differences between ceramic-containing binders and polymer-containing binders, both discussed extensively in the literature. It should also be noted the drop volume could change as much as 15% over the Z parameter range reported, where the lower viscosity binders exhibit larger drop volumes. Considering the small amount of polymer in the binder and the 3 wt % increments between samples, these variations do not significantly contribute to the compressive strength comparisons.

The formulation of polymeric binders also requires consideration of the viscoelastic properties of polymer solutions. As the concentration of polymers in solution increases, the solution exhibits transitions from dilute to semi-dilute unentangled regimes. Dilute solutions behave as Newtonian fluids, and the viscosity of the solution solely depends on the contribution from single-coil polymer chains. The critical overlap concentration (C*) denotes the transition from the dilute to the semi-dilute unentangled regime, where the solution acts as a viscoelastic fluid and the viscosity depends on the interaction between polymer chains. These transitions and solution viscoelastic behavior also strongly depend on molecular weight and polymer architecture because of the different radii of gyration ($R_g$). Some examples exist for jetting viscoelastic fluids using piezoelectric systems, but systematic studies investigating jetting solution above C* using thermal jetting systems do not exist in the literature.[43] This study aims to examine the jettability of linear and 4-arm star PVP analogs at varying molecular weights as water-based polymeric binders as a function of C* in thermal inkjet systems.

Figure 3A:
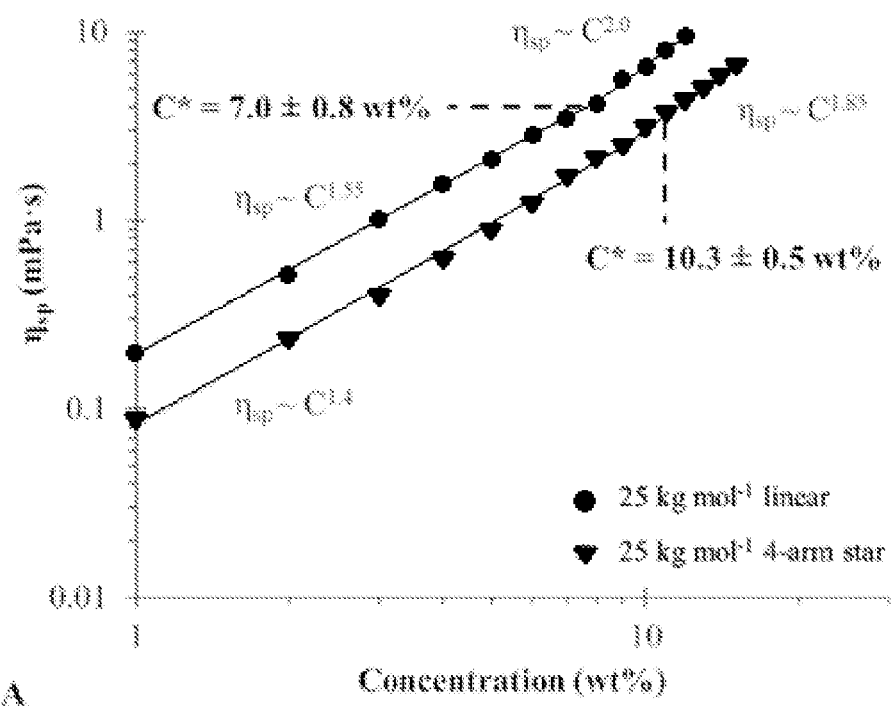
FIGS. 3A-3B are graphs of the zero shear viscosity as a function of concentration (FIG. 3A) where the dashed line denotes the critical overlap concentration (C*) and a plot of C* (bars) and the maximum jettable wt % (circles) of PVP as a function of $M_n$ and polymer architecture (linear on the left, 4-arm star on the right) (FIG. 3B).

Steady-shear solution rheology experiments from 1-20 wt % of linear and 4-arm star PVP in DI water without Tween 20® elucidated the transitions from the dilute to semi-dilute unentangled regimes. FIG. 3A depicts linear and 4-arm star PVP at 25 kg mol$^{-1}$ as an example C* determination experiment. Scaling theory predicts the power law slope of concentration vs. viscosity in the dilute and semi-dilute unentangled regions for neutral, linear polymers is $C^{1.0}$ and $C^{1.25}$, respectively, where the transition between the two regimes denotes C*. These experiments revealed C* for 25 kg mol$^{-1}$ linear and 4-arm star PVP in DI water were 7.0±0.8 and 10.3±0.5 wt %, respectively. 4-Arm star PVP exhibited a higher C* because of its smaller $R_g$ and the requirement of more polymer in solution to experience the onset of chain overlap compared to the linear analog. Linear and 4-arm star analogs experience slopes of $C^{1.55}$ and $C^{1.4}$ for the dilute regime and $C^{2.0}$ and $C^{1.85}$ for the semi-dilute unentangled regimes, respectively, which does not agree with scaling theory. Although water is considered a good solvent for PVP[44], water also has the ability to hydrogen bond with PVP, which may explain the deviations from known values.

Figure 3B:
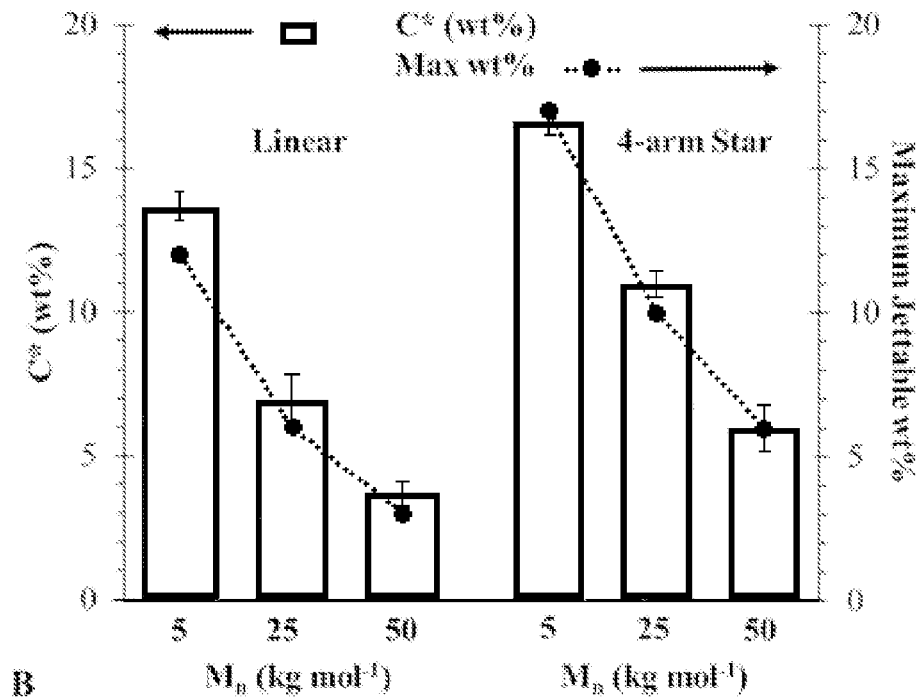

FIG. 3B depicts the C* and the maximum jettable wt % of linear and 4-arm star PVP as a function of $M_n$. Jetting each of these systems revealed the binders could not successfully eject from the nozzles above C*. Above C*, the solution viscosity depends on the interactions between polymer chains, which changes the polymer relaxation times. Literature demonstrated polymer solutions above C* and with complex rheological behavior are able to print on piezoelectric print heads with larger nozzle diameters. This data suggests C* may predict the maximum concentration of polymer jettability for thermal systems as opposed to a viscosity limit determined by the Z parameter ranges. Further studies using polymer architectures with varying C*'s may better elucidate this dependency. It should also be noted the shape of the drops were not investigated, only whether a single drop jetted out of the nozzle and consistent, uniform tablets were formed.

Binder Jetting

The optimal ratio of lactose and powdered sugar was initially chosen based on a tradeoff between powder spreadability and printed tablet strength. Preliminary experiments consisting of varying powdered sugar to lactose ratios (0 to 40 wt %) with a constant binder formulation (5 wt % commercially available 40 k linear PVP, 2 wt % Tween 20®) revealed a 4:1 lactose:powdered sugar wt:wt combination provided reproducible spreadability and tablet strength. Incorporation of >40 wt % powdered sugar resulted in particle aggregation while spreading, and <20 wt % powdered sugar resulted in tablets exhibiting crushing strengths of <0.1 MPa. Particle sizes of powdered sugar range from 5-30 µm (measured via SEM) and particles below 25 µm tended to disrupt flow due to surface energy of the particles.[45] Each successfully printed binder did not produce layer shifting at 100% saturation. Measurements of thickness and diameter of each printed tablet confirmed a less than 5%-dimensional error in each direction of each combination printed. This consistency is extremely important to achieve exact personalized dosage tablets.

Tablet Physical Properties

Figure 4A:
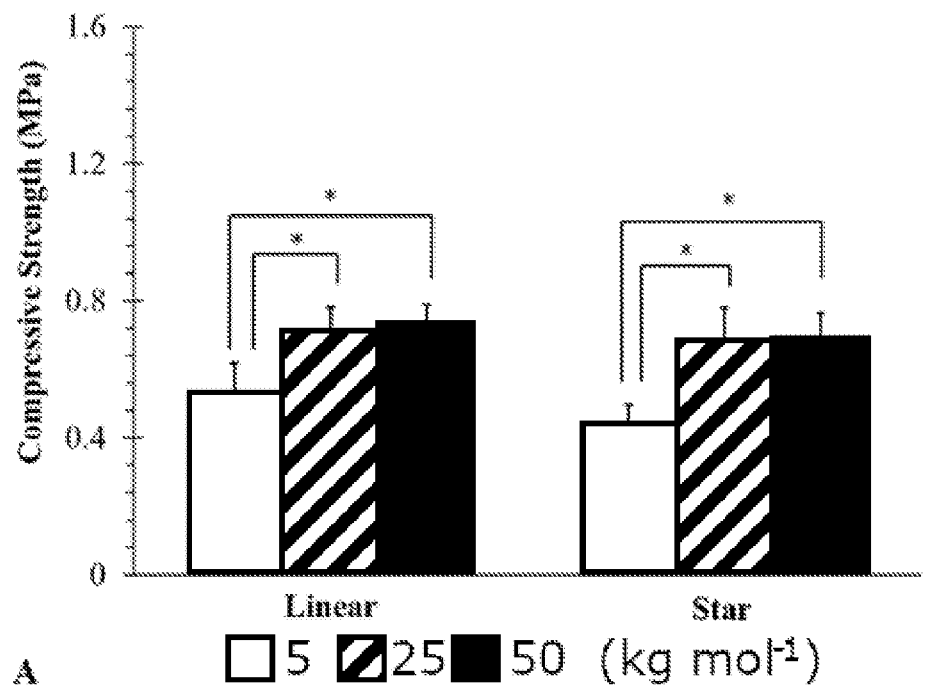
FIGS. 4A-4B are graphs of the compressive strength of linear and 4-arm star PVP as a function of molecular weight (FIG. 4A) and wt % (FIG. 4B).

Tablets for oral personalized dosage pharmaceuticals must maintain compressive strengths above 0.4 MPa to maintain fidelity during possible recoating processes and to survive packaging and handling (Shabana, M. A, *Res. Rev. J. Pharm. Pharm. Sci.* 2016, 5 (2), 108-114.) FIG. 4 depicts the results of compression strength experiments aimed to elucidate the relationships between tablet compressive strength and compressive modulus with polymeric binder $M_n$'s, polymer wt % in the binders, and polymer architectures (Table 2). FIG. 4A shows the compressive strength of the printed tablets as a function of linear and 4-arm star PVP $M_n$. Because this experiment aims to compare $M_n$'s, the examples chosen were all printed with 3 wt % PVP in the formulation as higher $M_n$ in some systems produced non-jettable solution viscosities. For both linear and 4-arm star examples, there existed a statistical difference between the compressive strength of tablets printed with 5 kg mol$^{-1}$ and 25 kg mol$^{-1}$ PVP, and 5 kg mol$^{-1}$ and 50 kg mol$^{-1}$ PVP. These relationships revealed a dependence of $M_n$ on tablet compressive strength as tablets containing 25 and 50 kg mol$^{-1}$ PVP facilitated a stronger tablet than the 5 kg mol$^{-1}$ PVP samples.

TABLE 2

Physical properties summary of jettable linear and 4-arm star PVP combinations.

| Topology | Targeted $M_n$ (kg mol$^{-1}$) | Concentration (wt %) | Compressive strength (MPa) |
| --- | --- | --- | --- |
| Linear | 5 | 3 | 0.54 ± 0.05 |
| Linear | 5 | 6 | 0.71 ± 0.05 |
| Linear | 5 | 9 | 0.99 ± 0.09 |
| 4-Arm Star | 5 | 3 | 0.43 ± 0.05 |
| 4-Arm Star | 5 | 6 | 0.67 ± 0.08 |
| 4-Arm Star | 5 | 9 | 0.97 ± 0.13 |
| Linear | 25 | 3 | 0.72 ± 0.06 |
| Linear | 25 | 6 | 1.01 ± 0.09 |
| 4-Arm Star | 25 | 3 | 0.69 ± 0.07 |
| 4-Arm Star | 25 | 6 | 0.86 ± 0.09 |
| 4-Arm Star | 25 | 9 | 1.24 ± 0.11 |
| Linear | 50 | 3 | 0.74 ± 0.07 |
| 4-Arm Star | 50 | 3 | 0.70 ± 0.06 |
| 4-Arm Star | 50 | 6 | 0.96 ± 0.15 |

Figure 4B:
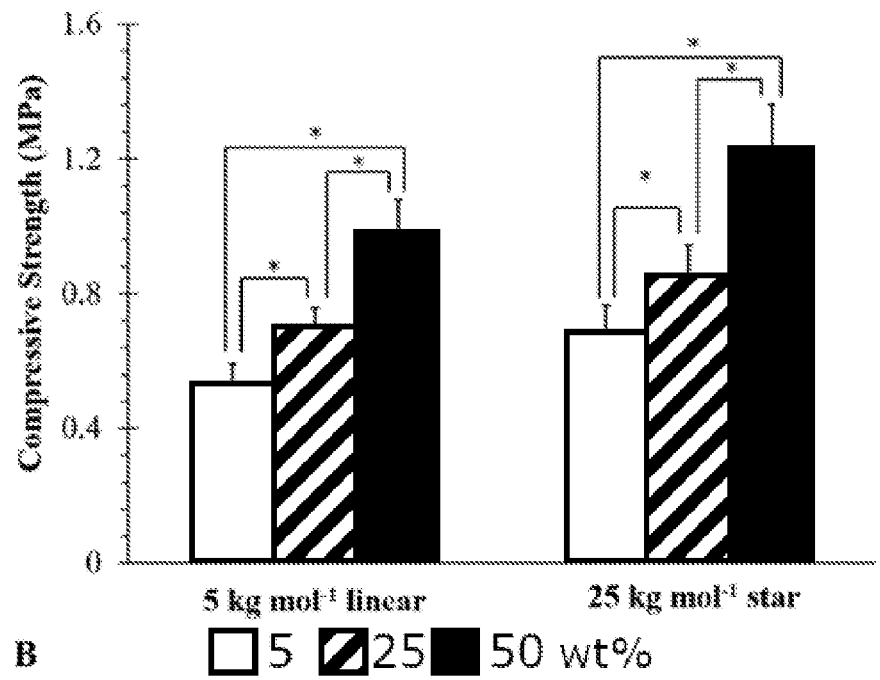

FIG. 4B depicts the compressive strength of printed tablets as a function of wt % PVP in the binder formulations. In each linear and 4-arm star example, there existed a statistical difference between tablet compressive strength with increasing PVP wt % in the binders. These relationships revealed a dependence of wt % PVP in the binder formulations on the tablet compressive strength. Because of viscosity constraints, only 5 kg mol$^{-1}$ linear, 5 kg mol$^{-1}$ 4-arm star, and 25 kg mol$^{-1}$ 4-arm star PVP were jetted at all three concentrations. Moreover, it should be noted the highest compressive strength achieved in this study (1.2 MPa) arose from a binder formulation using 25 kg mol$^{-1}$ 4-arm star PVP at 9 wt % in DI water. As discussed previously, 25 kg mol$^{-1}$ 4-arm star PVP-containing binders were able to print at 9 wt % and 25 kg mol$^{-1}$ linear PVP was not because of C* values. Above C*, the solution became viscoelastic and the chains began to overlap, resulting in the requirement of a higher shear rate to enable jetting of the solution.

Figure 4C:
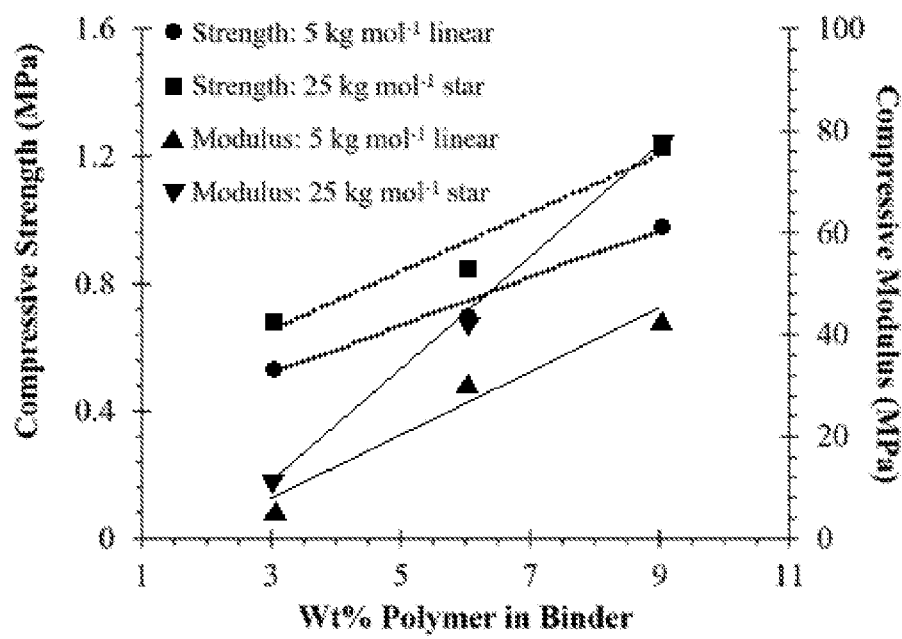
FIG. 4C is a graph of the compressive strength and compressive modulus as a function of wt % polymeric binder.
Figure 4D:
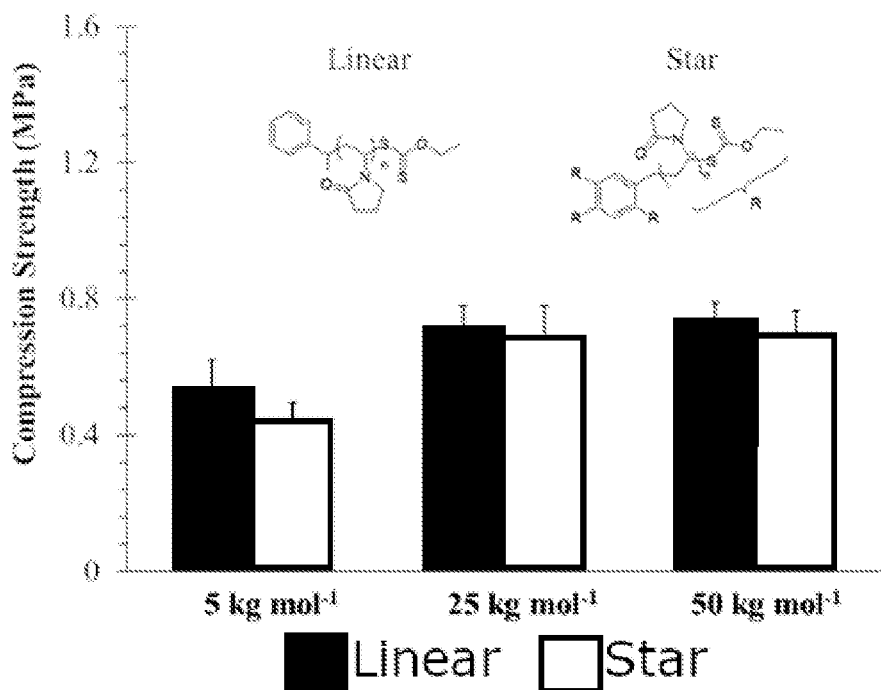
FIG. 4D is a graph of the compressive strength as a function of polymer architecture.
Figure 5:
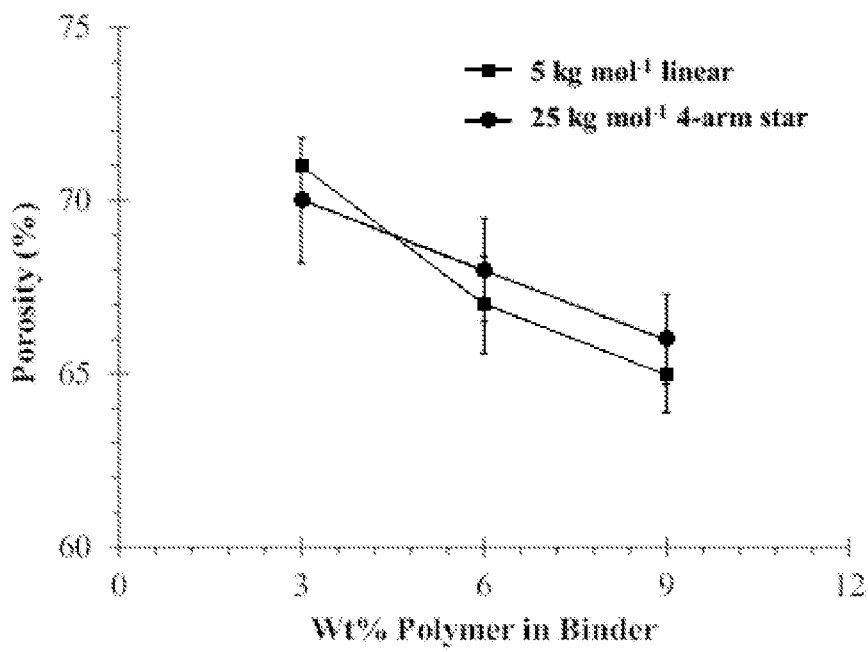
FIG. 5 is a graph of the porosity of binder jetted tablets as a function of wt % PVP in each binder composition.

FIG. 4C depicts the linear relationships that arose between the compressive strength and compressive modulus as a function of wt % polymer in each binder formulation. As discussed previously, with increasing wt % polymer, the compressive strength and modulus increased. FIG. 4D compares tablet compressive strengths using linear and 4-arm PVP architectures at the same molecular weights all containing 3 wt % polymer in the binder formulations. This data revealed there was no dependence on polymer architecture alone on the tablet compressive strength. The 4-arm star architecture remained important because of its ability to jet at higher FIG. 5 depicts the relationship between porosity and wt % polymer in the binder composition using 5 kg mol$^{-1}$ linear PVP and 25 kg mol$^{-1}$ 4-arm star PVP as representative examples. In both cases, statistical differences existed between each wt %, indicating a decrease in porosity with increasing wt %. Across all samples, the porosity ranged from 71 to 65%, which is common for binder jetted parts (Patirupanusara, P. et al., *J. Mater. Process. Technol.* 2008, 207 (1-3), 40-45) As a comparison, tablets made through direct compression maintain porosities of 7 to 51%, but do not function as immediate release tablets (Hancock, B. C.; et al., The Relative Densities of Pharmaceutical Powders, Blends, Dry Granulations, and Immediate-Release Tablets; 2003) Binder jetted tablets, which usually exhibit porosities from 50 to 80%, provide tablets with sufficient surface area to dissolve immediately. As described previously, the compressive strength and compressive modulus increased with increasing wt % polymer. Increasing the polymeric binder in the composition resulted in decreasing void spaces, which has previously been shown to increase strength of porous materials.[48]

Addition of API

The tablets were intended to provide an immediate release profile, which is common for oral tablets from binder jetting AM. A synergy between high porosity, water-soluble excipients, and water-soluble binders suggested this system as a candidate for immediate release systems. Adding API into the binder provides low-dose tablets with very selective placement of API where API in the powder combinations enables a higher loading. The chosen API, acetaminophen, was combined into the powder system and maintained particle sizes ranging from 5 to 150 μm (measured via SEM), which could affect tablet dimensional reproducibility and strength. To demonstrate a wide range of API inclusion and a maintenance of tablet strength and fidelity, various levels of API were introduced into the powder systems.

Figure 6A:
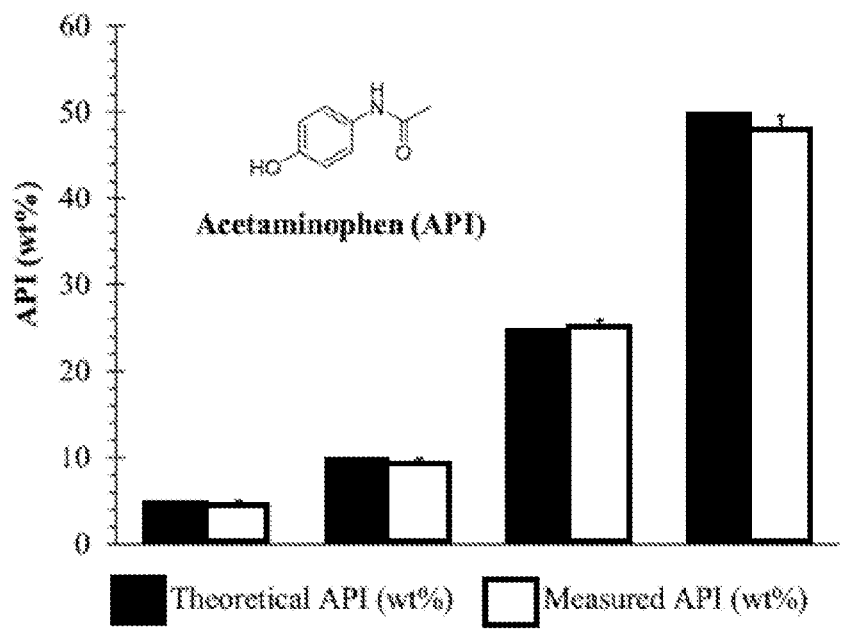
FIG. 6A is a bar graph of theoretical and measured API in printed tablets.

The addition of 5, 10, 25 and 50 wt % acetaminophen to the powder mixture enabled the printing of API-loaded tablets. The selected API loading amounts demonstrated the ability for this system to function as a candidate for personalized pharmaceuticals. In the future, pharmacies could maintain 3D printers in local offices to fill personalized prescriptions for people of all ages and sizes with multiple medications in each tablet. Each tablet discussed in this system exhibited an average total weight of 200 mg, where API loading of 5, 10, 25, and 50 wt % acetaminophen corresponds to 10, 20, 50, and 100 mg respectively. FIG. 6A depicts the comparison of the theoretical and measured API content in each tablet to ensure consistent and accurate dosing between tablets. $^1$H NMR spectroscopy of the tablet content revealed the actual amount of the API in each tablet were within a 3% difference of the theoretical values, which asserted feasibility in 3D printed pharmaceuticals.

Figure 6B:
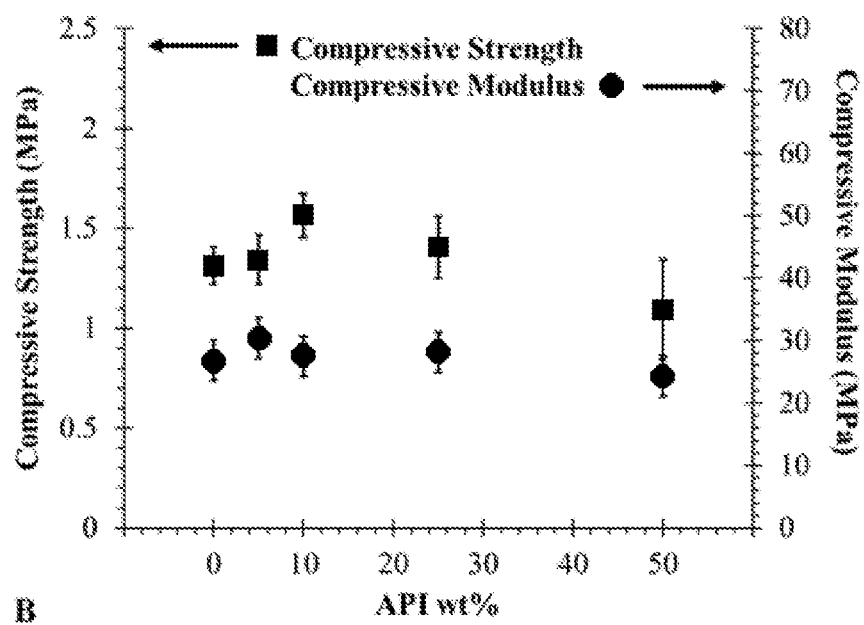
FIG. 6B is a graph of the compressive strength (squares) and modulus (circles) as a function of acetaminophen loading at 5, 10, 25, and 50 wt % using 6 wt % 25 kg mol-1 4-arm star PVP in DI water as the binder composition.

The varying wt % API showed consistent and agreeable dimensional accuracy and compressive strength compared to tablets without API. Measurements of thickness and diameter revealed an average thickness of 3.12±0.11 mm and average diameter of 12.14±0.15 mm, which confirmed retention of dimensional accuracy. FIG. 6B depicts the compressive strength and modulus as a function of API loading, which elucidated the maintenance of strength with API inclusion. Tablets with 5-50 wt % API maintain the statistically equivalent strength as tablets without API. A statistical difference in theoretical and measured API amounts existed between the non-API containing tablet and the sample with 50 wt % API possibly due to the large range of API particle sizes creating inconsistent layer spreading and possibly resulting in more void space.

Water dissolution of each tablet combination, with and without API, revealed each sample dissolved in below 30 s (Table 3), which is consistent with immediate release tablets.[49] The samples without API did not show a trend related to concentration of polymer in the binder, architecture of the polymers, or molecular weight of the polymers. Considering lactose and powdered sugar are readily water-soluble, the powder properties combined with the high porosity morphology mostly dominated the dissolution times. An equivalent experiment of API loaded tablets revealed each tablet dissolved in less than 30 s, and there existed a statistical difference in dissolution times between 5 wt % and 50 wt % API loading. Acetaminophen is only slightly soluble in cold water (R. A. G.; Rasmuson*, Å. C. *Solubility of Paracetamol in Pure Solvents*. 1999), therefore breakup of the tablet into individual particles denoted dissolution. The tablets containing 5 wt % and 50 wt % loading dissolved in 12 and 28 s, respectively, where the hydrophobicity of the API mainly contributed to the dissolution rates. In the future to achieve a range of dissolution rates, more hydrophobic powders and higher wt % loading of an adhesive agent into the binders will be used.

TABLE 3

Water dissolution summary of jettable tablets with and without API.

| Topology/MW (kg mol$^{-1}$) | API in powder (wt %) | Concentration in binder (wt %) | Dissolution Time (s) |
|---|---|---|---|
| Linear/5 | 0 | 3 | 24 ± 13 |
| Linear/5 | 0 | 6 | 20 ± 14 |
| Linear/5 | 0 | 9 | 12 ± 12 |
| 4-Arm Star/5 | 0 | 3 | 19 ± 13 |
| 4-Arm Star/5 | 0 | 6 | 13 ± 11 |
| 4-Arm Star/5 | 0 | 9 | 19 ± 10 |
| Linear/25 | 0 | 3 | 10 ± 8 |
| Linear/25 | 0 | 6 | 22 ± 12 |
| 4-Arm Star/25 | 0 | 3 | 21 ± 12 |
| 4-Arm Star/25 | 0 | 6 | 13 ± 10 |
| 4-Arm Star/25 | 0 | 9 | 22 ± 12 |
| Linear/50 | 0 | 3 | 20 ± 11 |
| 4-Arm Star/50 | 0 | 3 | 14 ± 11 |
| 4-Arm Star/50 | 0 | 6 | 13 ± 9 |
| 4-Arm Star/25 | 5 | 6 | 12 ± 9 |
| 4-Arm Star/25 | 10 | 6 | 18 ± 12 |
| 4-Arm Star/25 | 25 | 6 | 24 ± 13 |
| 4-Arm Star/25 | 50 | 6 | 28 ± 9 |

Printed Tablet Imaging

Figure 7A:
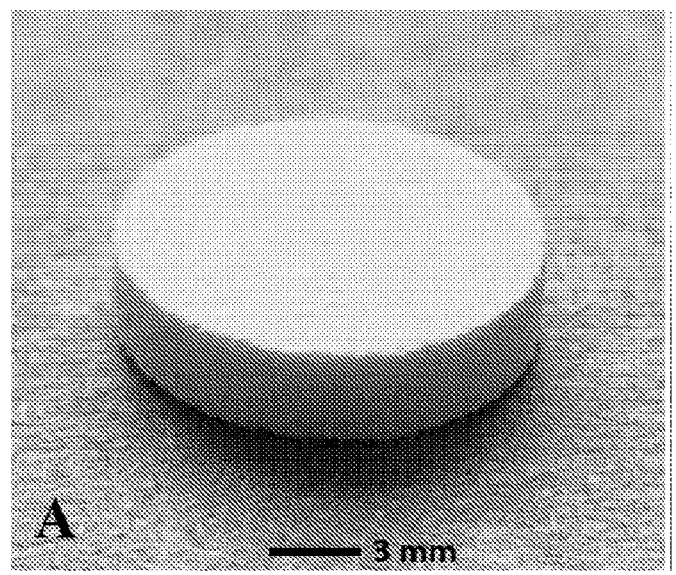
FIGS. 7A-7C are images of the binder jetted tablets with 5:1 lactose:powdered sugar with 6 wt % 25 kg mol-1 4-arm star PVP (FIG. 7A), SEM image of the tablet surface at 24× magnification and (FIG. 7B), and a SEM image of the freeze-fractured cross-sectional area at 60× magnification (FIG. 7C).
Figure 7B:
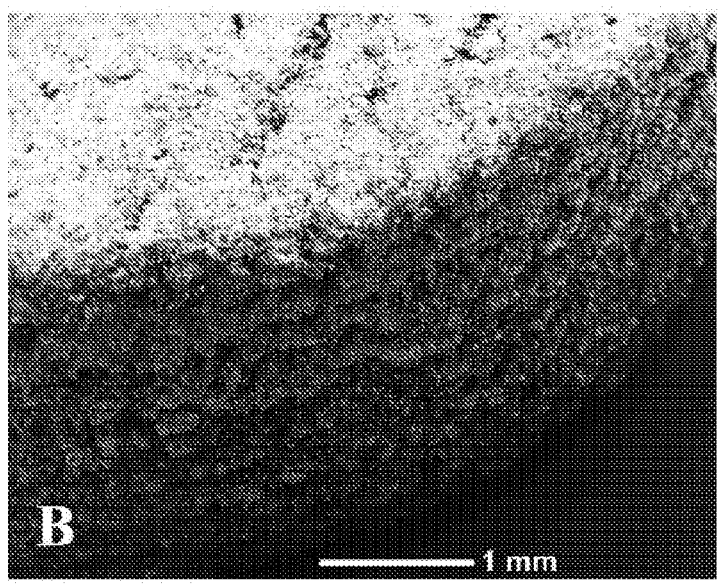
Figure 7C:
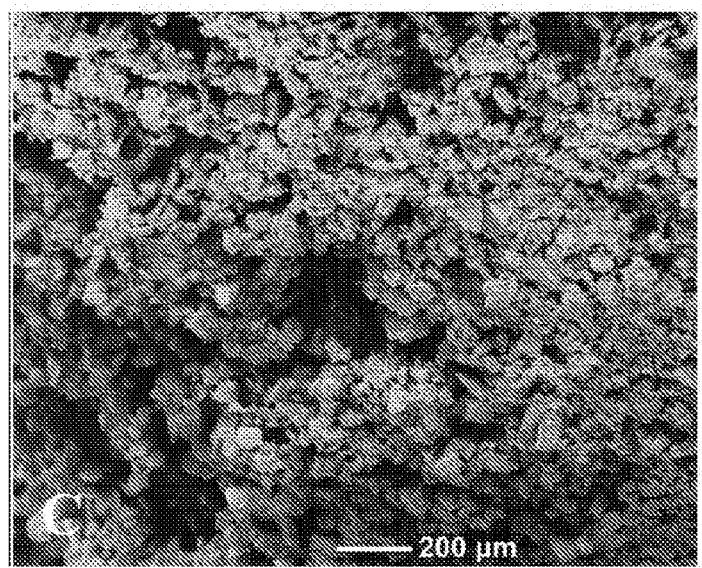
Figure 7D:
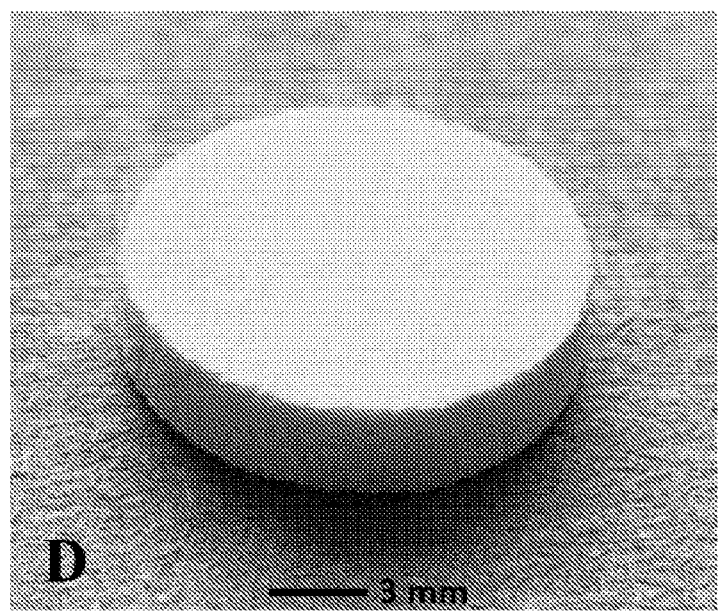
FIGS. 7D-7F are images of the binder jetted tablets with 6 wt % 25 kg mol-1 4-arm star PVP (FIG. 7D), SEM image of the tablet surface at 30× magnification and (FIG. 7E), and a SEM image of the freeze-fractured cross-sectional area at 24× magnification (FIG. 7F).
Figure 7E:
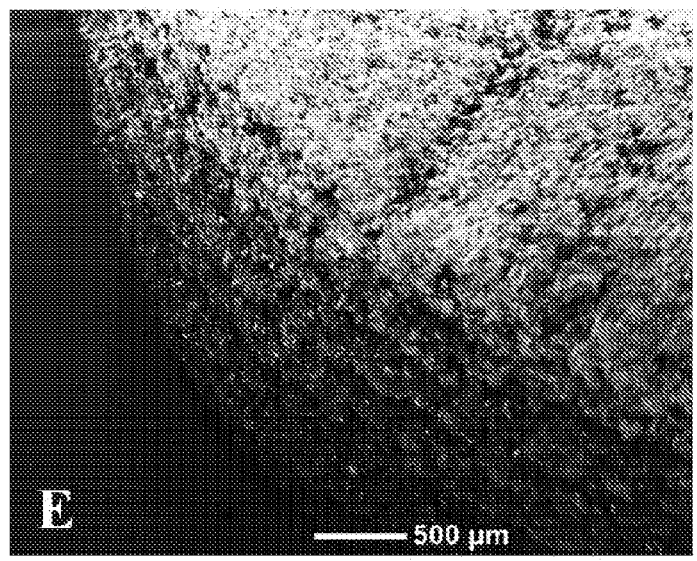
Figure 7F:
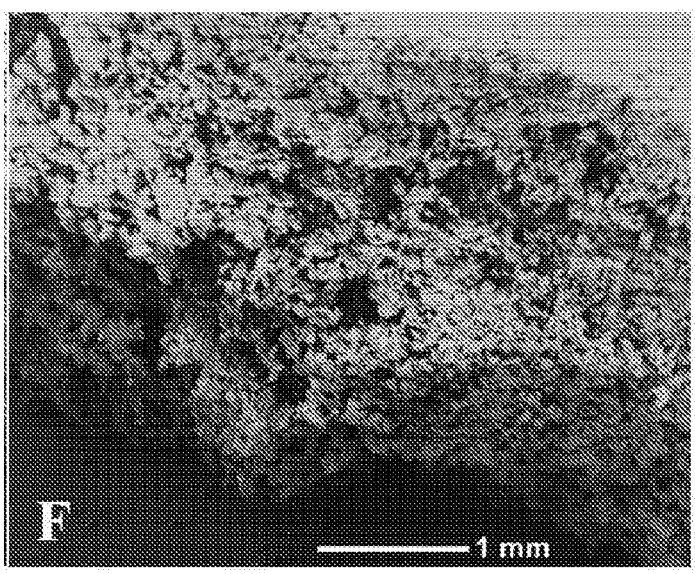

FIGS. 7A, B, C and 7D, E, F depict images and SEM images of binder jetted tablets with the same binder, 6 wt % 25 kg mol$^{-1}$ 4-arm star PVP, and powder combinations of 4:1 lactose:powdered sugar and 10:75:15 acetaminophen:lactose:powdered sugar (10 wt % API), respectively. On a macroscopic scale as depicted in FIGS. 7A and 7B, the two tablets had similar appearances. FIGS. 7B and 7E depict SEM images of the surfaces of binder jetted tablets. Both surfaces appear similar where surface roughness is apparent. FIGS. 7C and 7F depict SEM images of freeze-fractured, cross-sectional areas of each tablet. Both images reveal void spaces within the tablets, which agreed with quantitative porosity calculations.

CONCLUSION

The development of AM of personalized dosage pharmaceuticals has the potential to revolutionize manufacturing of oral tablets. Currently, the field of binder jetting AM for tablets is limited due to the lack of literature on polymeric binders other than commercially available options. This investigation of linear and 4-arm star PVP architectures, molecular weights, and polymer concentration effects on tablets physical properties aims to not only expand the materials toolbox for binder jetting AM, but also elucidate structure-property relationships between molecular structures and printed parts. While $M_n$ above 25 kg mol$^{-1}$ polymers increased tablet compressive strength, the largest factor in increasing compressive strength was an increase in polymer concentration in the binder compositions. Star PVP with 4 arms printed at the highest concentration compared to linear analogs at the same $M_n$ because of decreased solution viscosity and increased C* in DI water. The results herein not only elucidated the relationships between polymer solution properties and jettability on a thermal printhead, but also indicated these materials should be used for personalized dosage pharmaceuticals.

It should be emphasized that the above-described embodiments of the present disclosure are merely possible examples of implementations, and are set forth only for a clear understanding of the principles of the disclosure. Many variations and modifications may be made to the above-described embodiments of the disclosure without departing substantially from the spirit and principles of the disclosure. All such modifications and variations are intended to be included herein within the scope of this disclosure.

We claim:

1. A method of binder jetting of a 3D-printed article in a layer-by-layer fashion, the method comprising:
   a) providing a first layer of powder;
   b) ink-jet depositing a binder onto the first layer of the powder in a pattern that corresponds to a first layer of the article, wherein the binder comprises a branched-chain polymer and a solvent;
   c) providing a subsequent layer of powder onto either the first layer of powder or a previous layer of powder;
   d) ink-jet depositing the binder onto the subsequent layer of powder in a pattern that corresponds to a subsequent layer of the article;
   e) repeating steps (c) and (d) to form the article layer-by-layer by forming each subsequent layer of the article on a previous layer of the article;
   wherein the concentration of the branched-chain polymer in the binder is above a maximum printable concentration of the otherwise same binder and under the otherwise same conditions except replacing the branched-chain polymer with a linear-chain polymer of the same repeat units and having the same $M_n$.

2. The method according to claim 1, wherein the branched-chain polymer has a $M_n$ of about 5 kg mol-1 to about 75 kg mol-1.

3. The method according to claim 1, wherein the branched-chain polymer has a polydispersity index (PDI) of about 1.0 to about 30.0.

4. The method according to claim 1, wherein the branched-chain polymer has a glass transition temperature ($T_g$) of about 40° C. to about 250° C.

5. The method according to claim 1, wherein the branched-chain polymer is selected from the group consisting of a short-chain branched polymer; a long-chained branched polymer; a hyper-branched polymer, a cyclic polymer; a comb-type polymer; a 3-arm star type polymer, a 4-arm star type polymer, a dendritic polymer, and a combination thereof.

6. The method according to claim 1, wherein the branched-chain polymer is selected from the group consisting of polycarbonates, polyolefins, polymethacrylates, polystyrenes, polyamides, polyurethanes, poly(ethylene terephthalate), poly(lactic acid), poly(glycolic acid), polyhydroxybutyrate, polydioxanones (e.g., 1,4-dioxanone), δ-valerolactone, 1-dioxepanones (e.g., 1,4-dioxepan-2-one and 1,5-dioxepan-2-one), polyesters, poly(ethylene glycol), poly(ethylene oxides), polyacrylamides, cellulose esters, fluoropolymers, vinyl polymers, silk, collagen, alginate, chitin, chitosan, hyaluronic acid, chondroitin sulfate, glycosaminoglycans, poly(hydroxyethyl methacrylate), polyvinylpyrrolidone, poly(vinyl alcohol), poly(acrylic acid), polyacetate, polycaprolactone, poly(propylene, glycol) s, poly(amino acids), copoly (ether-esters), poly(alkylene oxalates), polyamides, poly(iminocarbonates), polyoxaesters, polyorthoesters, polyphosphazenes, polypeptides and copolymers, block copolymers, homoploymers, blends and combinations thereof.

7. The method according to claim 1, wherein the binder further comprises a surfactant.

8. The method according to claim 1, wherein the solvent comprises water or other aqueous solvents, organic solvents, and a mixture thereof.

9. The method according to claim 1, wherein the branched-chain polymer is made via a living radical polymerization of a monomer selected from the group consisting of styrene, vinyl benzyl chloride, 2-vinyl pyridine, 4-vinyl pyridine, methyl acrylate, ethyl acrylate, methyl methacrylate, ethyl methacrylate, butyl methacrylate, butyl acrylate, acrylic acid, methacrylic acid, 2-hydroxyethyl methacrylate, 2-hydroxyethyl acrylate, 2-hydroxypropyl acrylate, 2-hydroxypropyl methacrylate, acrylamide, methacrylamide, dimethyl acrylamide, dimethyl(meth)acrylamide, allyl methacrylate, dimethylaminoethyl methacrylate, dimethylaminoethyl acrylate, diethylaminoethyl methacrylate, diethylaminoethyl acrylate, divinyl benzene, ethyleneglycol dimethacrylate, ethyleneglycol diacrylate, triethylene glycol dimethacrylate, tetraethyleneglycol dimethacrylate, triethyleneglycol diacrylate, tetraethyleneglycol diacrylate, 1,3,5-triallyl-1,3,5-triazine-2,4,6 (1 H,3H,5H)-trione, dodecane thiol, hexane thiol, 2-mercaptoethanol and fragments arising from azobis isobutyronitrile, di-f-butyl peroxide, and f-butyl peroxybenzoate.

10. The method according to claim 1, wherein powder is selected from the group consisting of a ceramic powder, a polymer powder, a carbon powder, a metal powder, a drug or other bioactive compound.

* * * * *